United States Patent [19]

Rhodes

[11] Patent Number: 5,841,480
[45] Date of Patent: *Nov. 24, 1998

[54] FILM TO VIDEO FORMAT CONVERTER USING LEAST SIGNIFICANT LOOK-UP TABLE

[75] Inventor: Charles W. Rhodes, Alexandria, Va.

[73] Assignee: Advanced Television Technology Center, Alexandria, Va.

[*] Notice: The term of this patent shall not extend beyond the expiration date of Pat. No. 5,617,218.

[21] Appl. No.: 307,594
[22] PCT Filed: May 6, 1994
[86] PCT No.: PCT/US94/05081

§ 371 Date: Nov. 6, 1995

§ 102(e) Date: Nov. 6, 1995

[87] PCT Pub. No.: WO94/27405

PCT Pub. Date: Nov. 24, 1994

Related U.S. Application Data

[63] Continuation-in-part of Ser. No. 57,495, May 6, 1993, Pat. No. 5,617,218, Ser. No. 404,190, Sep. 7, 1989, Pat. No. 5,280,397, Ser. No. 53,230, Apr. 28, 1993, Pat. No. 5,504,532, and Ser. No. 404,190.

[51] Int. Cl.$^6$ .................................................. H04N 5/782
[52] U.S. Cl. .......................... 348/459; 348/441; 386/131
[58] Field of Search ..................................... 348/441, 445, 348/714, 443, 449, 453, 715–719, 459; 386/129, 131; H04N 5/76, 7/01, 5/782

[56] References Cited

U.S. PATENT DOCUMENTS

| | | | |
|---|---|---|---|
| 5,243,421 | 9/1993 | Hagata et al. | 348/411 |
| 5,243,433 | 9/1993 | Hailey | 348/411 |
| 5,347,385 | 9/1994 | Glenn | 348/458 |
| 5,389,974 | 2/1995 | Bae | 348/555 |
| 5,574,506 | 11/1996 | Rhodes | 348/459 |
| 5,617,218 | 4/1997 | Rhodes | 348/441 |

*Primary Examiner*—Michael Lee
*Attorney, Agent, or Firm*—Banner & Witcoff, Ltd.

[57] ABSTRACT

A format converter is provided for converting without loss of picture information a motion picture film image to and/or from a given recorder/player format. The recorder/player stores chrominance and luminance data as 8 bit digital samples. The motion picture chrominance information is also provided as 8 bit samples. The motion picture luminance data is provided either 9 or 10 bit samples. The 8 most significant bits of each luminance sample are stored as sequential 8 bit samples in the fields of the player/recorder. The additional 1 or 2 bits per luminance sample is/are stored at the end of the sequential 8 bit samples in each field of the recorder/player. During replay, the additional 1 or 2 bits per sample is/are matched with a corresponding 8 bit sample to reform 9 or 10 bit luminance samples.

34 Claims, 26 Drawing Sheets

FIG. 9

| SOURCE LINE | DVTR LINE (PACKETS) | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| 1 | 0000-1369 + 0000-0547 | | | | | | | | | | | | | | |
| 2 | | 0548-1369 + 0000-1095 | | | | | | | | | | | | | |
| 3 | | | 1096-1369 + 0000-0273 | | | | | | | | | | | | |
| 4 | | | | 0274-1369 + 0000-0821 | | | | | | | | | | | |
| 5 | | | | | 0822-1369 + 0000-1369 | | | | | | | | | | |
| 6 | | | | | | | | | | | | | | | |
| 7 (FIRST REPEAT) | | | | | | 0000-1369 + 0000-0547 | | | | | | | | | |
| 8 | | | | | | | 0548-1369 + 0000-1095 | | | | | | | | |
| 9 | | | | | | | | 1096-1369 + 0000-0273 | | | | | | | |
| 10 | | | | | | | | | 0274-1369 + 0000-0821 | | | | | | |
| 11 | | | | | | | | | | 0822-1369 + 0000-1369 | | | | | |
| 12 | | | | | | | | | | | | | | | |
| 13 | | | | | | | | | | | | | | | |
| 14 (SECOND REPEAT) | | | | | | | | | | | | | | 0000-1369 + 0000-0548-1 | |
| 15 | | | | | | | | | | | | | | | |

DIGITAL RECORDING SCHEME FOR FIRST EXEMPLARY PROPOSED FORMAT

○ 103.5 BLOCKS OF 5 PACKETS = 517.5 PACKETS PER FIELD
○ 103.5 BLOCKS OF 7 ACTIVE LINES = 724.5 ACTIVE LINES PER FIELD

FIG. 10

DIGITAL RECORDING SCHEME FOR SECOND EXEMPLARY PROPOSED FORMAT

- 34.5 BLOCKS OF 15 PACKETS = 517.5 PACKETS / FIELD
- 34.5 BLOCKS OF ACTIVE VIDEO LINES = 483 ACTIVE LINES / FIELD

DVTR LINE (PACKET)

| SOURCE LINE | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0000-1917 1918-2054 | | | | | | | | | | | | | | |
| 2 | | 0000-1780 1781-2055 | | | | | | | | | | | | | |
| 3 | | | 0000-1643 1644-2054 | | | | | | | | | | | | |
| 4 | | | | 0000-1506 1507-2054 | | | | | | | | | | | |
| 5 | | | | | 0000-1369 1370-2054 | | | | | | | | | | |
| 6 | | | | | | 0000-1232 1233-2054 | | | | | | | | | |
| 7 | | | | | | | 0000-1095 1096-2054 | | | | | | | | |
| 8 | | | | | | | | 0000-0958 0959-2054 | | | | | | | |
| 9 | | | | | | | | | 0000-0821 0822-2054 | | | | | | |
| 10 | | | | | | | | | | 0000-0684 0685-2054 | | | | | |
| 11 | | | | | | | | | | | 0000-0547 0548-2054 | | | | |
| 12 | | | | | | | | | | | | 0000-0410 0411-2054 | | | |
| 13 | | | | | | | | | | | | | 0000-0273 0274-2054 | | |
| 14 | | | | | | | | | | | | | | 0000-0136 0137-2054 | (FIRST REPEAT) |

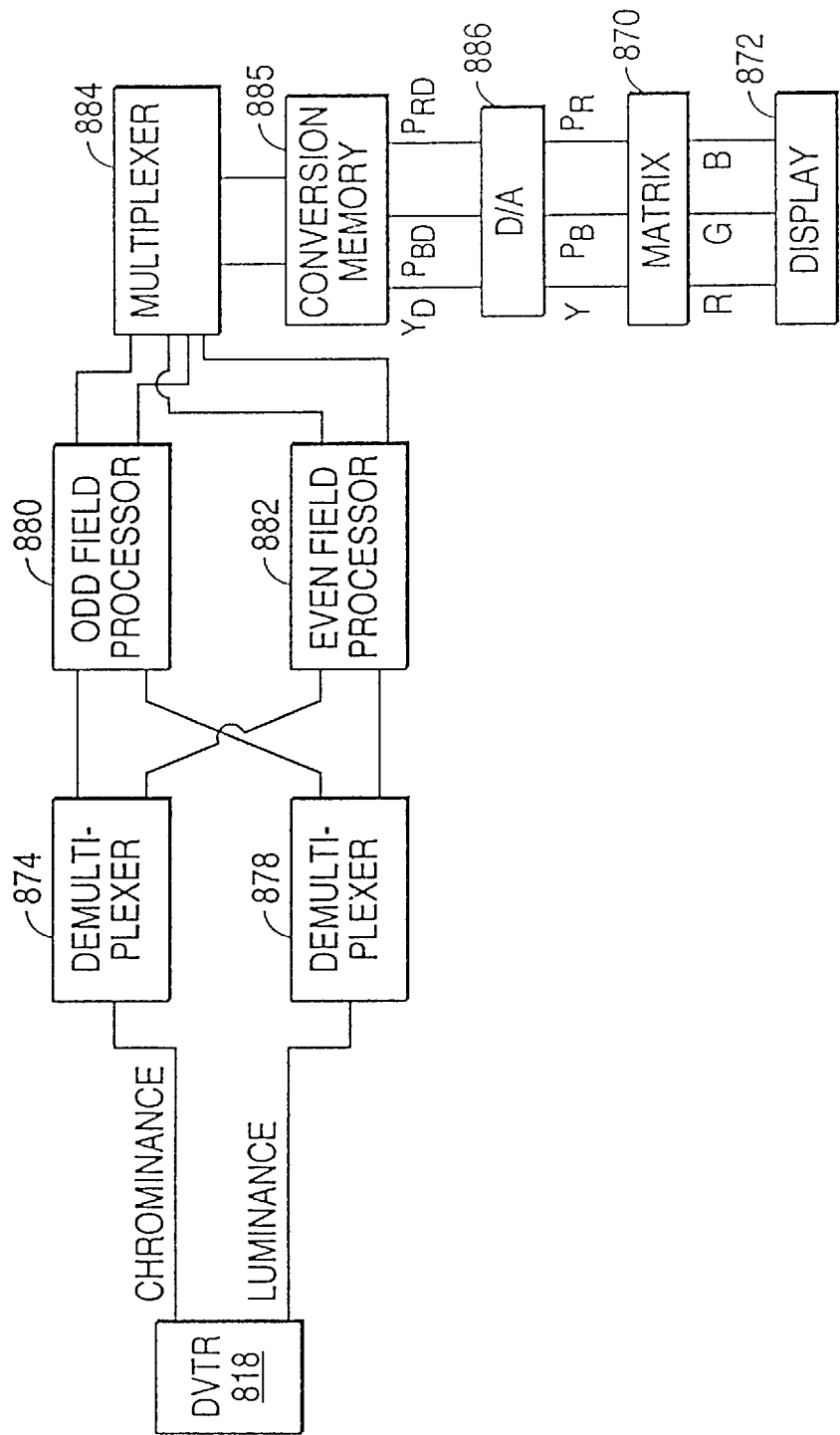

FILM TO VIDEO FORMAT CONVERTER USING LEAST SIGNIFICANT LOOK-UP TABLE

REFERENCE TO THE PARENT APPLICATIONS

This application is a continuation-in-part of application Ser. No. 08/057,495, (now U.S. Pat. No. 5,617,218), filed May 6, 1993, which is a continuation-in-part of application Ser. No. 07/404,190 (now U.S. Pat. No. 5,280,397), filed Sep. 7, 1989. This application is also a continuation-in-part of application Ser. No. 08/053,230(now U.S. Pat. No. 5,504,532), filed Apr. 28, 1993, which is also a continuation-in-part of application Ser. No. 07/404,190 (now U.S. Pat. No. 5,280,397), filed Sep. 7, 1989.

BACKGROUND OF THE INVENTION

1. Technical Field

This invention relates to high definition television and motion picture film images and, more particularly, relates to a method and apparatus for converting without loss of picture information a high definition television format to and from a given recorder/player format, and a motion picture film image format to and from a given recorder/player format.

2. Related Information

Prior to the introduction in the United States and Japan of the existing NTSC standard television signal format and the introduction in Europe of the PAL and SECAM formats, there was considerable discussion over which broadcast black and white format to choose. Some broadcast formats were desirable because they exhibited less RF interference when transmitted. Other broadcast formats were desirable because they delivered a television picture having a sharper or less choppy image. Discussion again occurred, upon the introduction of color television, over which color signal broadcast format to choose and whether the chosen color format should be compatible with the broadcast black and white television format. In the United States today, the same issues are again being raised over the choice of a second generation television format—commonly known as high definition television (HDTV) or advanced television (ATV). Recent issues include discussion concerning which format is best suited for conventional over-the-air broadcast as well as best suited for transmission over new mediums such as fiber optic cable, coaxial cable, telephonic, broadcast satellite, and pre-recorded mediums. The recent issues include discussion of whether the new HDTV format should be compatible with the present NTSC format. While the Federal Communications Commission of the United States would like the new format to be NTSC compatible, there is considerable influence world-wide to adopt a totally new standard. The discussion further includes the issue of whether a proposed format will be adversely affected during broadcast or transmission on the new mediums and whether such a proposed format will subjectively provide an adequate picture. Many formats have been proposed for adoption by proponents both inside and outside the United States.

The Advanced Television Test Center was established in Alexandria, Va., as a neutral test center for evaluation and comparison of proposed HDTV formats. Besides testing the proposed HDTV formats for immunity to electrical interference and other impairments and testing for NTSC compatibility, the proposed HDTV formats are shown to viewers for subjective evaluation. Viewers compare, by psycho-physical testing, the proposed HDTV formats and rate them as to their characteristics with and without transmission impairments. In order to perform testing on all proposed formats, the television test center has a need for a uniform video tape recorder which can record all proposed source formats.

Such a uniform video source may be provided by a video tape recorder capable of recording any one of all proposed HDTV formats and playing back in the recorded HDTV format. Several digital video tape recorders (DVTR), for example, the Sony HDD-1000 and the Hitachi DVTR, are capable of recording or playing back a HDTV signal. Either the Sony or the Hitachi video tape recorder is capable of recording 1920 bytes of luminance data at 74.25 megabytes per second and two chrominance data components comprising another 1920 bytes per line at 74.25 megabytes per second as packets of data. Digital data packets are recorded at a rate of 1035 lines per frame with each frame having 2 fields. The HDD-1000 has a field rate of 60 Hz at which 74.25 megabytes per second are recorded as mentioned above. The HDD-1000 can also be used at a field rate of 59.94 Hz at which 74.175 megabytes per second as recorded. The field rate of 59.94 Hz is actually 60×(1000/1001) Hz. While a DVTR is capable of recording and playing back in accordance with the above-described input/output specifications, a requirement remains to provide an interface for such a recorder allowing other source formats to be recorded uniformly without the introduction of losses.

Prior systems have been proposed for recording at least one format on a single video tape recorder. For example, U.S. Pat. No. 4,549,224, issued to Nakamura et al., provides an apparatus for recognizing either an NTSC or a PAL/SECAM format and generating an appropriate recording frequency dependent on the recognized format. The Nakamura system is incapable of recording proposed high definition television formats. Furthermore, the Nakamura system does not perform signal conversion for recording or playback in a desired format.

Systems are also known for providing conversion between television formats. Many systems, however, are incapable of converting television formats without loss or alteration of picture quality. At the Advanced Television Test Center, conversion between formats must occur without alteration of picture quality or loss of information content. All known conversion systems use interpolation techniques and approximation algorithms for this type of conversion. For instance, U.S. Pat. No. 4,587,556, issued to Collins, discloses a television standard converter for converting conventional PAL and NTSC signals using weighing factors and interpolation. Furthermore, U.S. Pat. No. 4,276,565, issued to Dalton et al., converts conventional television formats using interpolation. U.S. Pat. No. 4,658,284, issued to Kawamura et al., is capable of downsizing a 625 line PAL format to a 525 line format for printing on a color printer. Interpolation is used for downsizing conversion. Conversion between conventional formats is also performed in U.S. Pat. No. 4,661,862 issued to Thompson, wherein data reduction is performed by deletion and in U.S. Pat. No. 4,283,736, issued to Morio et al., wherein conversion by discarding or repeating information signals is performed. Such schemes entail loss in picture quality or content. Interpolation itself is a filtering function. Some information must be lost and therefore such schemes cannot be truly bi-directional.

Other systems such as that disclosed in U.S. Pat. No. 4,743,958, issued to Bannister et al. convert conventional encoded NTSC, PAL, SECAM and analog RGB, YUV to separate chrominance and luminance signals for input to a special effects device. Bannister et al. performs the conversion using filters for processing the signals. U.S. Pat. No. 4,463,387, issued to Hashimoto et al., processes video data both before recording and after playback for quality improvement. No conversion is performed.

Systems for adapting an input to, a VCR include U.S. Pat. No. 4,597,020, issued to Wilkinson, wherein a video signal is shuffled before recording and unshuffled upon playback to disburse bursts of errors. U.S. Pat. No. 4,530,048, issued to Proper, adapts a VCR for computer memory backup storage. Proper concerns interfacing a VCR to avoid VCR information dropouts, a problem of no concern for digital video recording. U.S. Pat. No. 4,638,380, issued to Wilkinson et al., discloses a multiple head video tape recorder with switching and interpolation to remove the effects of a failed head.

Yet another system disclosed in U.S. Pat. No. 4,797,746 to Ashcraft is directed to a system for converting digital image information in a storage format to a format such as a digital scan converter or standard television format. The disclosed system includes a high bit rate interface unit (HBRI) comprising an input controller, an image buffer RAM, an output controller and a system controller. The HBRI receives stored data from a storage device, such as a tape unit or an optical disk, and based on commands output from the system controller, converts the received data to another format. The system controller commands the input controller as to the location in the image buffer RAM where each data point or bit is read. The output controller is responsive to the commands of the system controller for reading out each data point from the image buffer RAM so that a standard digital scan converter format or television format is produced.

U.S. Pat. No. 4,577,240 to Hedberg et al. relates to a system capable of on-line acquisition, processing and display of radiographs and for off-line recording, retrieval, review, image processing and archival storage of images. The disclosed system includes word formatter circuits which convert incoming digital data having a width of between 6 and 10 bits into a sequence of 5 separate data streams for recording into a centralized library. The word formatter circuits are used in playback to convert the recorded data for display by HDTV direct imaging or fluoroscopy to produce film quality images.

U.S. Pat. No. 4,651,208 was issued to Charles Rhodes, the inventor of the present application, and was assigned to an assignee other than the assignee of the present application. The patent discloses conversion between widescreen and non-widescreen television transmissions using input/output multiplexers for line conversion in line memory pairs. Picture lines are clocked into and out of a memory to change the aspect ration of a picture from a large to a small picture aspect ratio. The process is not bi-directional because side panel pixels are discarded when a wide aspect ratio image such as 16:9, is converted to a less wide aspect ratio image, such as 4:3. Afterwards, the reduced aspect ratio image cannot be reconverted back to the original wide aspect ratio image.

None of the above systems provide a uniform video source for equally comparing proposed high definition television formats. Known interpolators and filters unfortunately reproduce and convert high definition television signals with the sacrifice of picture information. While the invention disclosed in aforementioned U.S. Pat. No. 4,651, 208 to Rhodes relates to a method and apparatus for converting widescreen television signals for display on non-widescreen television displays, the process is irrevocable and does not facilitate video recording.

There also exists in the motion picture industry a need to achieve motion picture film. The motion picture film used to record motion pictures is very fragile. It decays with age, and each showing of the film additionally wears the film. For many motion picture studios, one of their major assets is their film library. The remains today a demand for classic motion pictures filmed many years ago. There is a need to preserve these motion pictures. However, any achieving method selected must store the entire motion picture, without cutting off the edges, etc. Otherwise, the achieving method will not be acceptable to the motion film industry and/or motion picture producers. Also, since each time the film is played, it experiences wear, it is preferable that the achieved method provide an achieved copy from which additional masters may be made without degradation of the picture quality.

SUMMARY OF THE INVENTION

An important object of the present invention is to provide a recorder for recording a television format without loss of picture information.

Another object of the present invention is to provide a player for playing a television format without loss of picture information.

Another object of the present invention is to provide a recorder/player for playing back a television format without loss of picture information.

Another object of the present invention is to provide a converter for converting a television format to digital luminance and chrominance data signals for recording on a digital video recorder without loss of picture information.

Another object of the present invention is to provide a conversion circuit for playback of digital luminance and chrominance signals in a desired television format without loss of picture information.

A further object of the present invention is to provide a converter for allowing a commercially available digital video tape recorder to record and playback a television format.

Another object of the present invention is to provide a converter for storing data from a motion picture film image format in a memory in synchronism with the frame rate of the film image format and reading the data from the memory in synchronism with the field rate of a target format.

Another object of the present invention is to provide a converter which includes a plurality of spare lines of data with lines of data from a memory to generate a complete field of a television signal format.

The present invention solves the above-mentioned problems by providing a converter for converting without loss of picture information any high definition television format to and from a given recorder/player format. The format converter of the present invention provides an interface for converting between RGB and luminance/chrominance inputs and between analog and digital inputs. The interface couples any proposed high definition television format to a plurality of memory pairs. A clock and control circuit controls addressing of the memories for reading and writing so that conversion is performed between any high definition television format and the format required for the Sony HDD-1000 or Hitachi digital video tape recorder or any other comparable recorder.

In particular, during a record mode of operation, involving both a converter according to the present invention and a digital video tape recorder, the converter is responsive to horizontal and vertical drive synchronizing signals provided by a source format. The source format signal is digitized and stored in a memory at one rate and read from the memory at the rate of operation of the DVTR. An advantage of the present invention is that the size of the memory may be simultaneously limited and the clocking and controlling of the converter memory facilitated without any loss in the proponent's signal regardless of the input signal format. Furthermore, the reading of converter memory and writing of data into the DVTR are controlled and synchronized by the control signals provided by the source format.

During a playback mode of operation, the converter, according to the present invention, becomes the source of controlling the DVTR and the output to the broadcaster. Nevertheless, the same limited size memory may be employed with the same advantage as during the record mode.

In the event one of the proposed HDTV formats other than those formats based upon the format for which commercially available recorders are designed is adopted by the Federal Communications Commission in the United States, broadcasters will be able to employ the present invention with presently available commercial DVTRs (such as the Sony HDD-1000 or Hitachi DVTR) to record and playback HDTV pictures and audio—not having to await development of a new HDTV DVTR specifically constructed for the adopted format at an uncertain delay and possibly greater realized cost.

In another embodiment of the invention, a telecine, or similar devices, is used to digitize a successive frames of motion picture. The digital data is converted to a format compatible with a known DVTR and stored in the DVTR. Therefore, a digital copy of the entire motion picture is made. The digital copy may be stored and perfect copies made at any time. The digital copy may be read and then converted into an output format for viewing by a user, e.g., a television studio.

These and other objects and features of the present invention will become evident from the following detailed description of the invention when read in conjunction with the appended drawings.

BRIEF DESCRIPTION OF THE DRAWINGS

FIG. 9 illustrates how samples of lines of fields of a first exemplary source format are placed in the lines of fields of the digital video recorder.

FIG. 10 illustrates how samples of the lines of fields of a second exemplary source format are placed in the lines of fields of the digital tape recorder.

FIGS. 19(a) and 19(b) show playback mode block diagrams for converting a motion picture stored with enhanced resolution by a digital video recorder back to a motion picture format.

DETAILED DESCRIPTION OF THE INVENTION

Figure 1:
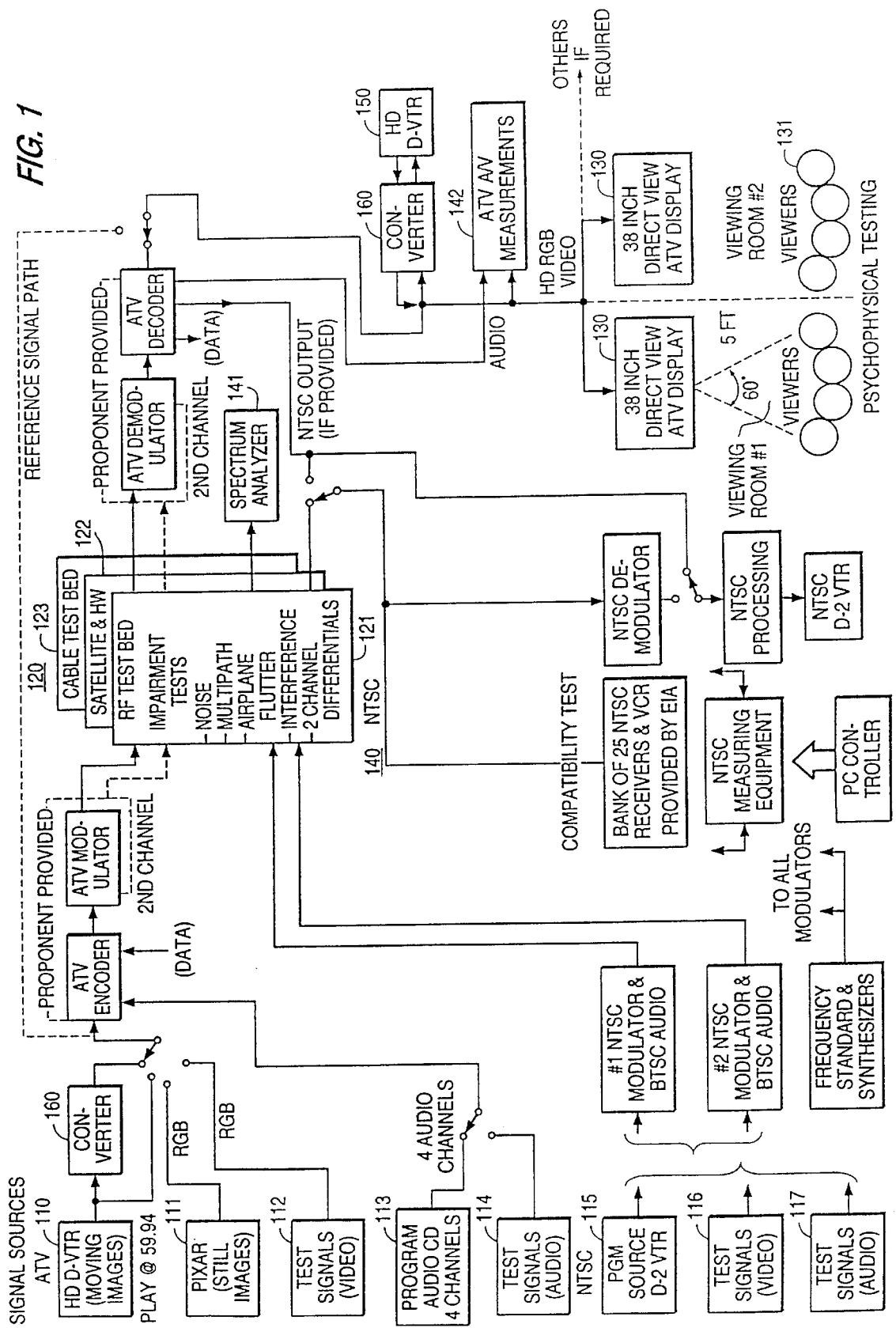
FIG. 1 is a block schematic diagram of a television test center for testing and comparing proposed HDTV source formats.

FIG. 1 illustrates a television test center utilizing the multiple HDTV format/recorder players 110 and 150, including converter 160 of the present invention. Signal sources for high-definition television are provided by high-definition digital video tape recorder (DVTR), 110, PIXAR 111 and test signal block 112. Signal sources for test audio are provided by program audio block 113 and test signal audio block 114. Signal sources for the conventional NTSC format are provided by program source block 115, video test signal block 116 and audio test signal block 117. The outputs of the signal sources are directed to test bed 120, including RF test bed 121, satellite and microwaves test bed 122 and cable test bed 123. At test bed 120, the television signals are submiected to impairments including noise conditions, multipath, airplane flutter, two channel signal level and time differentials and interference. An impaired television signal is then sent from test bed 120 to displays 130 for psychophysical testing by viewers 131. An actual or impaired signal output from test bed 120 is also sent to processing equipment 140 for NTSC compatibility tests. The actual or impaired signal output from the test bed can be recorded on high definition television digital video tape recorder (DVTR) 150. Measurement of the HDTV signal can also be made by spectrum analyzer 141 and advanced television audio and visual measurement equipment 142. Digital video tape recorder 150 can also playback directly to high definition television displays 130 for psycho-physical testing.

The present invention provides converters 160 used in conjunction with high definition digital video tape recorders (DVTR) 110 and 150. DVTR 110 plays and DVTR 150 records in only one advanced television format. DVTR 110 is preferably a Sony HDD-1000 or Hitachi digital recorder/player having predetermined input/output specifications substantially in accordance with Japanese high definition broadcast standards; however, the principles of the present invention may be likewise applied to other digital signal recorders having other input/output specifications. Important specifications for the Sony HDD-1000 are illustrated in Table 1. Important specifications for the Hitachi DVTR are illustrated in Table II.

TABLE 1

| PARAMETERS | SPECIFICATIONS |
|---|---|
| 1. Coded signals Y, $P_B$, $P_R$ or G, B, R | These signals are obtained from Gamma Pre-corrected signals |
| 2. Number of samples per total line G,B,R or illuminance signal Each color difference signal ($P_B$, $P_R$) | Y 2200    G 2200<br>P 1100    B 2200<br>P 1100    R 2200 |
| 3. Sampling structure G,B,R, or illuminance signal Each color difference signal | Orthogonal Line, Field and Frame Repetitive<br>The G,S,R sampling structures to be coincident and coincident also with the luminance sampling structure of the Y, $P_B$, $P_R$ system. $P_B$ and $P_R$ samples cosited with odd (1st, 3rd, 5th, etc. Y samples in each line. |
| 4. Sampling frequency. G,B,R, or luminance signal Each color difference signal | Y 74.25 MHz    G 74.25 MHz<br>P 37.125 MHz    B 74.25 MHz<br>P 37.125 MHz    R 74.25 MHz<br>(1)<br>The tolerance for the sampling frequencies should coincide with the tolerance for the line frequency of the relevant 1125/60 HDTV standard |
| 5. Form of coding | Uniformly quantitized PCM at least 8 bits per sample |
| 6. Number of samples per digital active line: G,B,R or luminance signal Each color difference | Y 1920    G 1920<br>P 960    B 1920<br>P 960    R 1920 |
| 7. Analog-to-digital horizontal timing relationship From end of digital active line to the horizontal sync timing reference | (2)<br>88 Luminance clock periods |
| 8. Correspondence between video signal levels and the 8 most significant bits (MS8) of the quantization level for each sample:<br>Scale<br>G,B,R, or luminance signal<br><br>Each color difference signal | <br><br><br><br><br>0 to 255<br>220 quantization levels with the black level corresponding to level 16 and the peak white level corresponding to level 235.<br>The signal level may occasionally excurse beyond level 235.<br>226 quantization levels in the center part of the quantization scale with zero signal corresponding to level 126.<br>The signal level may occasionally excurse beyond level 16 and 240. |
| 9. Code word usage for the 8 most significant bits (MSB) | Code words corresponding to quantization levels 0 and 255 are exclusively for synchronization. Levels 1 to 254 are available for video. |

TABLE II

| Specifications | | | |
|---|---|---|---|
| General Tape Type: | | 2. Audio Input | |
| Recording/ Playback Time: | 1 Inch Metal Particle Tape | (1) Analog signal (line): | +4 dBm 600 OHMS/ 100K OHMS Switchable Balanced 8 Circuits |
| Power Requirements: | 63 Min. (11.76° Tool) 96 Min. (14.0° Tool) AC 100 V/117 V:10% | (2) Analog Signal (Cue): | Balanced 1 Circuit XLRx4/D-Sub X1 Switchable |
| Power Consumption Tape Transport Unit: Signal Processor Unit: | 50/60 Hz<br><br>950 W Approx. | (3) Digital Signal (CCIR Recommendation 647) | ±0.3 Vp-p 75 OHMS 1 Circuit |

TABLE II-continued

| | | | |
|---|---|---|---|
| Dimensions (W × H × D): | 1300 W Approx. | 3. Sync Input: Tri-Level Bipolar | 1 Circuit |
| Tape Transport Unit: | 480 = 844 × 745 mm | Pulse Sync Signal: | R, G, B, Y, $P_B/P_B$ Switchable |
| Signal Processor Unit: | (18-⅞ × 33-¼ × 29-5/16 in) 48-730 × 615 mm | 4. SMPTE Time Code Input: | 1.0 Vp-p 75 OHMS 2 Circuits Switchable |
| Weight: Tape Transport Unit: Signal Processor Unit: | (18-⅞ × 26-¾ × 24-3/16 in | 5. Video Output (1) Analog Signal: | (Video 0.7 Vp-p, Sync ±0.3 Vp-p) |
| Ambient Temperature: | 120 kg Approx. (265 lbs.) | | 8-Bit Parallel (74.25 MHz) |
| Video Sampling Frequency Y: | 110 kg Approx. (243 lbs.) | (2) Digital Signal Y: | Multiplex 8-Bit Parallel (74.25 MHz) |
| $P_B/P_B$: Quantization: | 15°–35° C. | | 74.25 MHz |
| Frequency Bandwidth: Y: | 74.25 MHz 37.125 MHz | $P_B/P_B$ | +4 dBm Low Impedance |
| $P_B/P_B$: 5/n: | 8 Bits/Sample | Clock: 6. Audio Output | Balanced 8 Circuits +4 dBm Low Impedance |
| K Factor: Digital Audio (Ch1–Ch2) Sampling Frequency: Quantization: Frequency Bandwidth: | 30 MHz ± 1.5 dB 15 MHz ± 1.5 dB 56 dB Less Than 1 (2T Pulse) | (1) Analog Signal (Line): (2) Analog Signal (Cue): | Balanced 1 Circuit XLRx4/D-Sub × 1 Switchable |
| Dynamic Range: Crosstalk: | 48 HAz 16 Bits/Sample 20 Hz-20 KHz- | (3) Digital Signal (CCIR | ±0.3 Vp-p 75 OHMS 2 Circuits |
| Emphasis: T1: T2: Analog Audio (Cue Track) Frequency Response: | +0.5 dB/1.0 dB Greater Than 90 dB Less Than - 80 dB (1 KHz Between Channels) | Recommendation 547) 7. Sync Output Tri-Level Bipolar Pulse Sync Signal: | 2.4 Vp-p Low Impedance 600 OHMS Balanced 1 Circuit |
| S/N: | 50 μS (On/Off Permitted) 15 μS (On/Off Permitted) | 8. SMFTE Time Code Output: | 1.0 Vp-p 75 OHMS 1 Circuit |
| Distortion | 100 Hz-12 KHz + 3 dB | | 1.0 Vp-p 75 OHMS |
| Input/Output Signals 1. Video Input (1) Analog Signal: | 41 dB (3% Distortion Level) Less than 3% (1 KHz, Operating Level) | 9. Monitor Output (1) Waveform Monitor Output Signal | 1 Circuit ±0.3 Vp-p 75 OHMS 1 Circuit |
| | | (2) Video Monitor Output Signal | ±0.3 Vp-p 75 OHMS 2 Circuits |
| (2) Digital Signal Y: $P_B/P_B$ | R, G, B/Y, $P_B/P_B$ Switchable 1.0 Vp-p 75 OHMS 1 Circuit | (3) Monitor Sync Output Signal (Tri-Level): | +4 dBm Low Impedance Balanced 1 Circuit |
| Clock: | Video 0.7 Vp-p, Sync ± 0.3 Vp-p) 8-Bit Parallel (74.25 MHz) Multiplex 8-Bit Parallel (74.25 MHz) 74.25 MHz | (4) Audio Main Signal Monitor Output (R)/(L): (Chosen From DA1-DA8 & Cue) 10. Sync Output (525/60): | 1 Circuit |

Converter 160, according to the present invention converts an advanced television or high definition television signal for recording or playback on DVTRs 110 and 150. Converter 160 will be discussed in conjunction with FIGS. 2 and 3 followed by a detailed discussion in conjunction with FIGS. 4–10.

Figure 2:
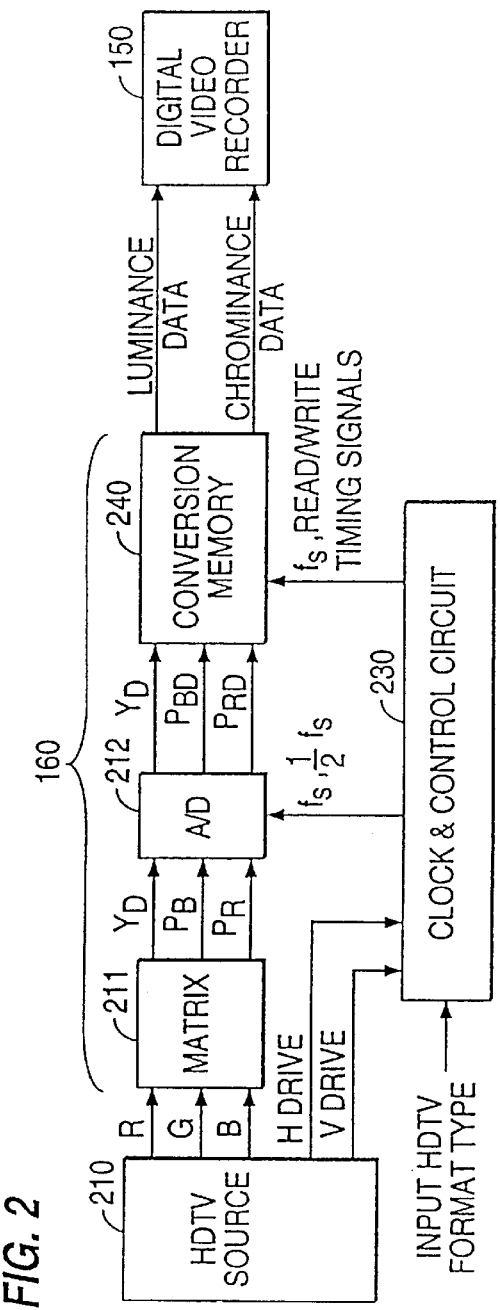
FIG. 2 is a block schematic diagram of components for recording a television format on a given digital video recorder.

FIG. 2 illustrates converter 160 adapted for recording a television format from HDTV source 210 on digital video recorder 160. HDTV source 210 can be a high definition television camera or other known source such as a specialized high definition television video player. Preferably, RGB (red, green, blue) signals, a FORMAT V-DRIVE IN (vertical) synchronization signal and a FORMAT H-DRIVE IN (horizontal) synchronization signal are provided by HDTV source 210 (FIG. 6(*a*)). Matrix 211 converts the RGB signals to luminance signal Y and chrominance color difference signals R–Y and B–Y. Matrix 211 is preferably constructed using resistors that combine the RGB signal according to the following equation:

$Y=0.731R+0.212G+0.087B$

The chrominance signals are found as R-Y and B-Y using resistors and phase inverters. Other chrominance signals can alternatively be converted such as I and Q associated with the video signal. Clock and control circuit 230 clocks analog to digital converter 212 at a frequency $f_s$ and $>f_s$ where $f_s$ is the sampling clock frequency. The luminance signal is digitized at the sampling frequency $f_s$ and the chrominance signals are digitized at the sampling frequency $>f_s$. Because the two chrominance signals will later be combined into a single chrominance signal, the chrominance signals are digitized at half the rate of the luminance signal.

It is conceivable that HDTV source 210 could provide signals in either analog or digital, RGB, or chrominance and luminance components. Thus, depending upon the particular output of the HDTV source, matrix 211 and analog to digital converter 212 may not be required.

Clock and control circuit 230 also provides control signals to conversion memory 240. Data indicating the high definition television format input by HDTV source 210 for recording on digital video recorder 150 is input to clock and control circuit 230 for programming the converter to provide control signals for the input HDTV format. This data can be input by an operator manually selecting the format to be employed or the format converter can be built for one specific format, for example, any format adopted by the United States. Based on the input HDTV format type and the FORMAT H-DRIVE IN and FORMAT V-DRIVE IN synchronization signals, clock and control circuit 230 outputs read, write and timing signals to conversion memory 240, thus instructing conversion memory 240 to convert the HDTV input format to a format suitable for recording on digital video recorder 150. Conversion memory control 230 controls conversion of the input HDTV format to luminance and chrominance data signals in accordance with FIGS. 9 and 10 which map data into memory 240.

Figure 3:
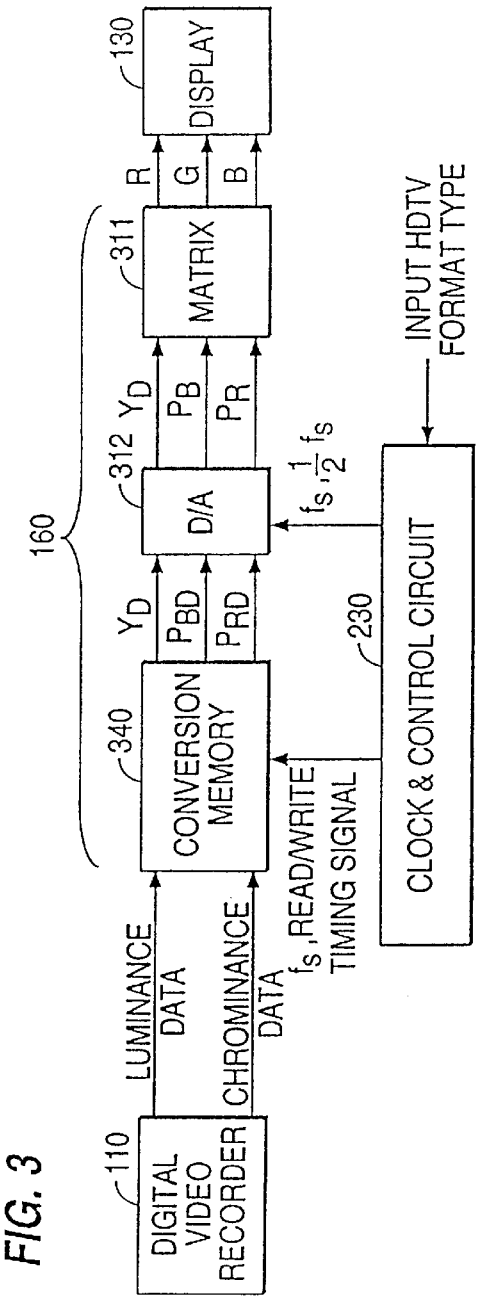
FIG. 3 is a block schematic diagram of components for playing back a signal on a digital video player in a television format.

FIG. 3 illustrates converter 160 for converting the output of DVTR 110 in playback mode, to an HDTV format displayed, for example, on display monitor 130. In playback mode, converter 160 controls the operation of the DVTR and provides synchronizing information with the output of the converted video signal. Display 130 can be any output device such as a monitor, a cathode ray tube, liquid crystal display, projection screen, video cassette recorder, or other output, storage, conversion or transmission device. Conversion memory 340 converts the digital signals in accordance with control signals from clock and control circuit 230. Digital to analog converter 312 and matrix 311 perform the reverse functions of matrix 211 and analog to digital converter 212. Further details of conversion memory 340 and digital to analog converter 312 will be discussed subsequently in conjunction with FIG. 5. Further details of clock and control circuit 230 will be discussed in conjunction with FIG. 8.

Figure 4:
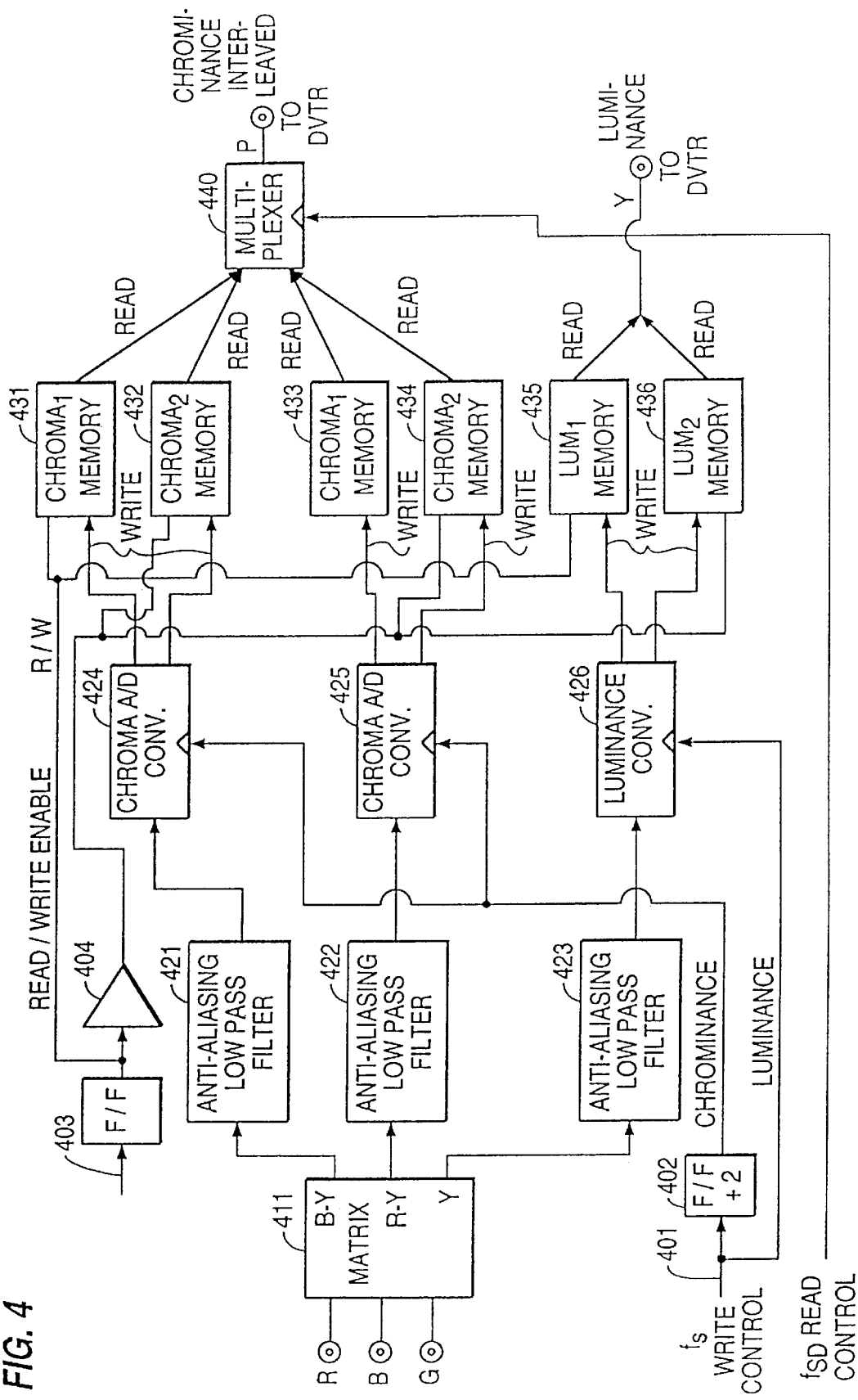
FIG. 4 is a detailed block schematic diagram of circuitry for converting an RGB television signal to digital luminance and chrominance inputs for a given digital tape recorder.

FIG. 4 illustrates in greater detail the components of FIG. 2. FIG. 4 particularly illustrates matrix 411, anti-aliasing filters 421–423, the individual components of analog to digital converters 424–426, memories 431–436 and multiplexer 440 during record mode. Matrix circuit 411 converts an analog RGB input signal to luminance and color difference signal outputs. Anti-aliasing low pass filters 421, 422 and 423 as well as analog to digital converters 424, 425 and 426 are shown connected to the outputs of matrix 411 B–Y, R–Y and Y, respectively. Write clock control signal 401 from controller 230 clocks luminance analog to digital converter 426 at $f_s$ and chrominance analog to digital converters 424 and 425 at $>f_s$ via divide by two flip-flop 402.

Two memories are connected to the output of each analog-to-digital converter. memories 431 and 432 are connected to the output of B–Y chrominance analog to digital converter 424 under read/write control 403 by controller 230. Likewise, memories 433 and 434 are connected to the output of R–Y chrominance analog to digital converter 425 and memories 435 and 436 are connected to the output of luminance analog to digital converter 426 under read/write control 403 by controller 230. Read/write control 403 from controller 230 controls alternatively read and write functions for the first and second memories connected to each analog to digital converter. For example, memory 431 alternatively reads and writes with respect to memory 432 under control of read/write control signal 403. Read/write control signal 403 connects directly to the first memory, for example, and read/write control signal 403 inverted by inverter 404 connects to the second memory. Consequently, under control of read/write control signa 403 from controller 230, digital video information can be written into the one memory and simultaneously read out of the other memory. Controller 230 controls addressing of video data written into and read out of the memories thereby performing a desired conversion between formats such as the conversion exemplified by FIGS. 7, 8, 9, and 10. Further details of the read/write clocking and control will later be described in conjunction with FIGS. 6(*a*) and 6(*b*).

Multiplexer 440 combines the outputs of memories 431, 432, 433 and 434 to yield a single chrominance signal. In particular, for the Sony HDD-1000 or Hitachi DVTR examples, the output of multiplexer 440 is an 8 bit, byte-interleaved B–Y/R–Y chrominance data bit stream of 1920 bytes per line at a 59.94 Hz field rate. The field rate of 59.94 Hz is actually 60×(1000/1001) Hz. Multiplexer 440 is controlled by controller 230 using a 74.175 MHz control signal to match the exemplary HDD-1000 74.175 megabyte per second data rate at a 59.94 Hz field rate. Because the chrominance memory outputs are multiplexed together, each chrominance memory only needs to be half the size of each luminance memory. The outputs of memories 435 and 436 are thus sequentially read to provide a 8-bit luminance data bit stream of 1920 bytes per line and at a 59.94 Hz field rate. according to the Nyquist criterion, no spectral component of any signal should exceed one-half the digitizing clock frequencies $f_s$ for luminance and 0.5 $f_s$ for chrominance. Therefore, low pass filters 421–423 shown in FIG. 4 are used in conjunction with analog to digital converters 424–426, respectively. The low pass filters can also be called anti-aliasing filters. Low pass filter 423 on the luminance component preferably has a –3 dB drop off approximately 0.4 $f_s$. Low pass filters 421 and 422 on the two chrominance components should have a –3 dB drop off at approximately 0.2 $f_s$. The filters should not cut off extremely rapidly at the Nyquist frequency of 0.5 $f_s$ and 0.25 $f_s$, respectively.

Figure 5:
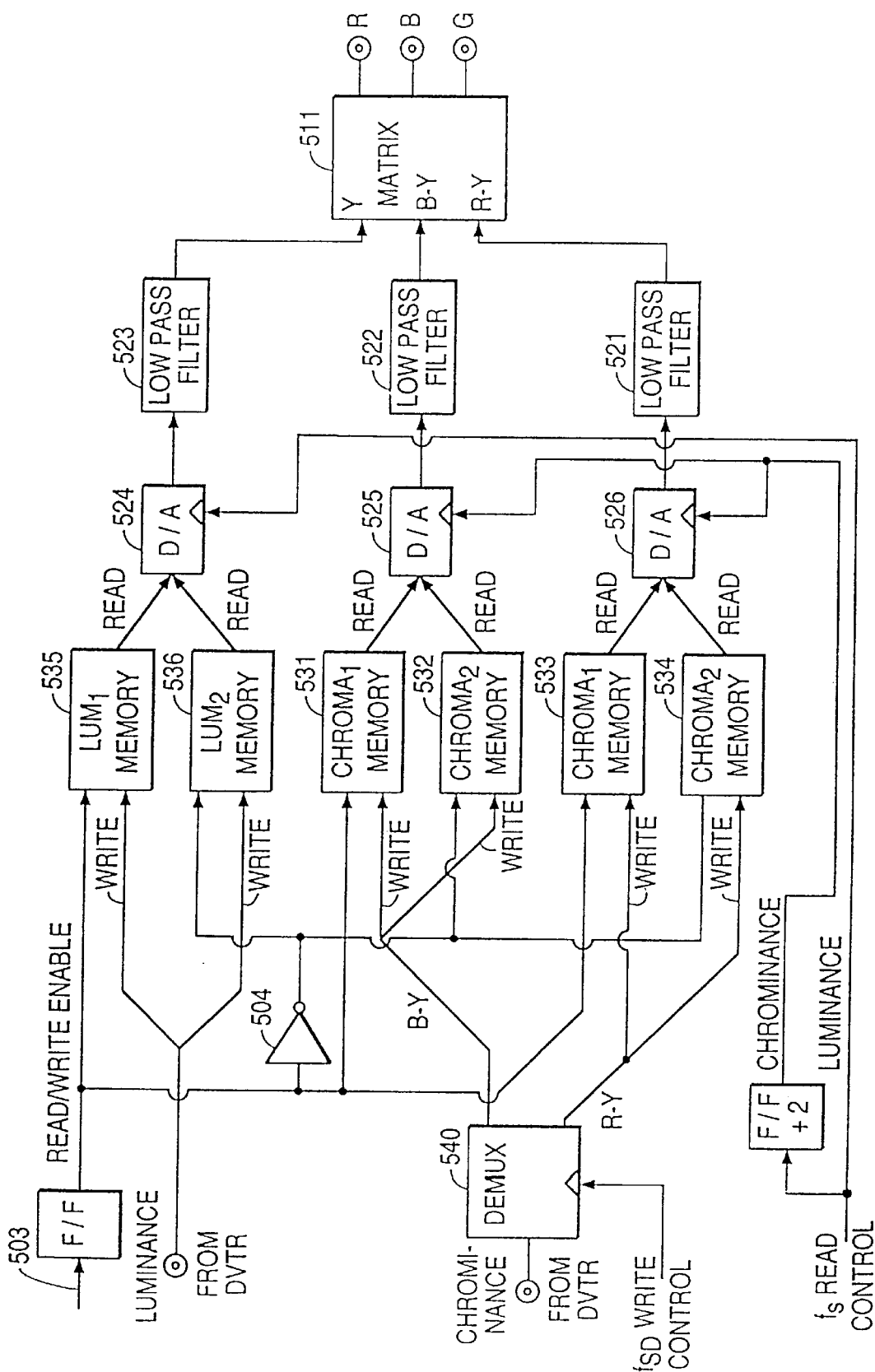
FIG. 5 is a detailed block schematic diagram of components for converting, to an RGB signal, digital luminance and chrominance outputs from a given digital tape player.

FIG. 5 illustrates in greater detail the components of FIG. 3. FIG. 5 particularly illustrates conversion memory 340 (memories 531–536), digital to analog converter 312 (converters 524–526) and matrix 311 (matrix 511) during playback mode. Read/write control 503 from controller 230 controls memory pairs for alternating read and write. Luminance data from, for example, digital video player 110 is alternately written in memories 535 and 536. The chrominance signal from digital video player 110 is de-multiplexed by de-multiplexer 540 using the 74.175 MHz control signal from control circuit 230 for the 59.94 Hz field rate. De-multiplexer 540 splits the chrominance signal into a B–Y signal stored in memories 531 and 532 and a R–Y signal stored in memories 533 and 534. Controller 230 controls the reading and writing from the memories to perform conversion back to the original HDTV format. The conversion controlled by controller 230 is performed in response to a desired input HDTV format programmed into the controller similarly as the control discussed above in conjunction with FIG. 4.

After conversion to the digital HDTV format, the outputs of the memories are respectively fed to digital-to-analog converters 524, 525 and 526. The outputs of-the above-mentioned digital-to-analog converters are respectively connected to low pass filter 523 having negligible response at 0.5 $f_s$ (about 38 MHz) and low pass filters 522, 521 having negligible response at 0.25 $f_s$ (about 19 MHz). The outputs of low pass filters 521, 522 and 523 feed through matrix 511 to produce an RGB high definition television output.

Figure 6A:
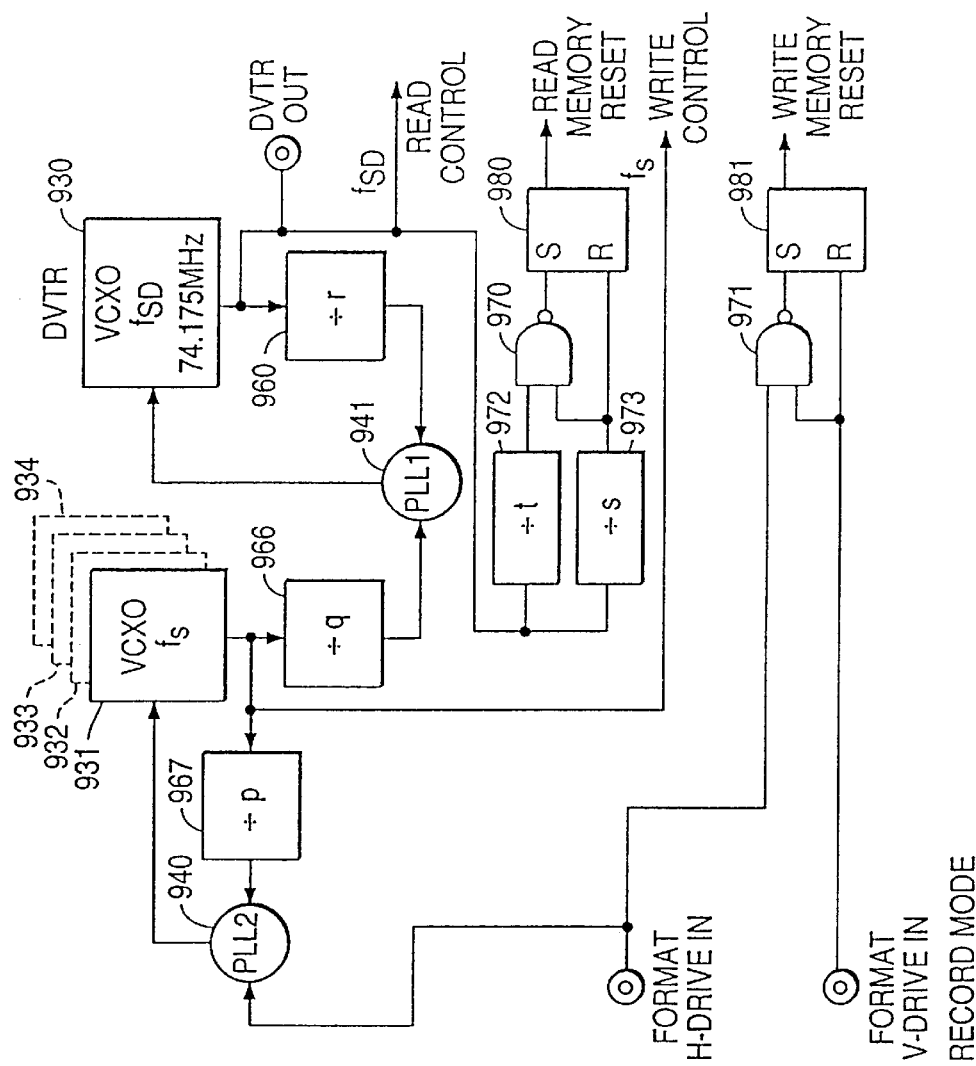
FIGS. 6(a) and (b) are record mode and playback mode generic block schematic diagrams, respectively, for clock and control oscillators.
Figure 6B:
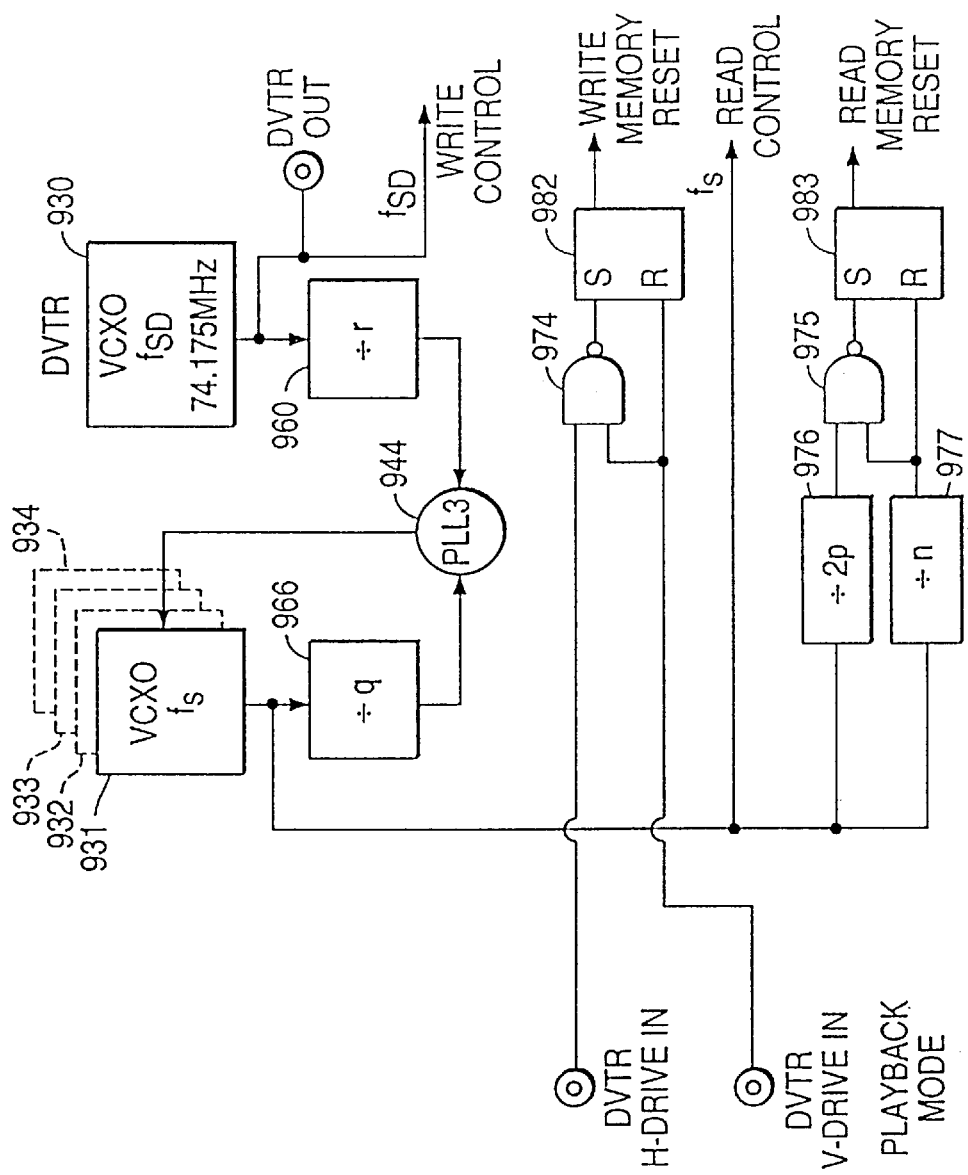

FIGS. 6(*a*) and 6(*b*) illustrate the clocking and control circuitry 230 to derive READ CONTROL, READ MEMORY RESET, WRITE CONTROL, WRITE MEMORY RESET and DVTR OUT synchronization control signals. FIG. 6(a) derives the signals for the record mode based on H-DRIVE IN and V-DRIVE IN from a broadcaster or proposed format source. In the record mode, the proposed format sampling rate $f_s$ oscillator 931 is locked to the broadcaster or proposed format source via phase locked loop PLL2 940. The DVTR is locked at DVTR frequency 74.175 MHz for the HDD-1000 by oscillator 930 locked to oscillator 931 via phase locked loop PLL1 941. FIG. 6(b) derives the signals for the playback mode wherein DVTR oscillator 930 drives the entire system like the broadcaster or proposed format source drove the entire system in the record mode. DVTR oscillator 930 drives the DVTR via DVTR OUT at 74.175 MHz for the HDD-1000. DVTR oscillator 930 also controls the sampling frequency $f_s$ oscillator 931 via phase locked loop PLL3 944.

FIG. 6(a) illustrates a generic depiction of the components for control in the record mode. Oscillator 931 is locked to FORMAT H-DRIVE IN via phase locked loop PLL2 940. Divide-by 967 divides down the output of oscillator 931 by p for a comparison in phase locked loop comparator 940 with the FORMAT H-DRIVE IN signal. The output of PLL2 comparator 940 trims the frequency of crystal oscillator VCXO 931. The output of crystal oscillator VCXO 931 and the output of DVTR crystal oscillator VCXO 930 are compared in phase locked loop PLL1 comparator 941. The output of phase locked loop PLL1 comparator 941 trims the frequency of crystal VCXO 930. The output of oscillator 931 is divided by q in divide-by 966 and the output of oscillator 930 is divided by r in divide-by 960 before comparison in phase locked loop PLL1 comparator 941.

The output of crystal VCXO 930 divided by t in divide-by 972 and divided by s in divide-by 973 is combined by NAND gate 970 and set by flip-flop 980 to yield the READ MEMORY RESET synchronization control signal. The FORMAT H-DRIVE IN and FORMAT V-DRIVE IN are combined by NAND gate 971 and set by flip-flop 981 to yield the WRITE MEMORY RESET synchronization control signal.

The DVTR OUT synchronization control signal of FIG. 6(a) drives the DVTR. The READ CONTROL and WRITE CONTROL synchronization control signals clock memory address for i.e., luminance read memory 435 and luminance write memory 436, respectively. Memories 431–436 are addressed by address counters (not shown). The address counters are programmed to count up to the number of necessary storage spaces required for conversion. The READ MEMORY RESET and WRITE MEMORY RESET synchronization control signals reset i.e., luminance read memory 435 and luminance write memory 436, respectively. When a memory is reset by a READ or a WRITE MEMORY RESET synchronization control signal, the signal's associated memory resets to a reference storage space—such as the upper-left corner of the frame.

VCXO oscillators 931 and 930 are preferably crystal oscillators. A crystal oscillator has a crystal ground to produce a very stable and accurate frequency. The oscillation frequency of the crystal can be controlled by a voltage controlled capacitor (varicap) or similar reactive means. Such an arcuate crystal oscillator is an ideal oscillator for accurate phase locked loop (PLL) frequency control. As an alternative to crystal VCXO oscillators, microprocessor control oscillators can be used in the event a microprocessor controlled oscillator is available having a frequency stability comparable to that of a crystal VCXO.

FIG. 6(b) illustrates a generic depiction of the components for control in the playback mode. Sampling frequency, crystal oscillator VCXO 931 and DVTR crystal oscillator VCXO 930 are compared in phase locked loop comparator PLL3 944 to control the frequency of oscillator 931. The output of phase locked loop PLL3 comparator 944 trims the frequency of oscillator 931. The output of oscillator 931 is divided by q in divide-by 966 and the output of oscillator 930 is divided by r in divide-by 960 before comparison in phase locked loop comparator 944.

The DVTR H-DRIVE IN and DVTR V-DRIVE IN are combined in NAND gate 974 and set by flip-flop 982 to yield the WRITE MEMORY RESET synchronization control signal. The output of crystal VCXO 931 divided by 2p in divide-by 976 by n in divide-by 977 is combined in NAND gate 975 and set by flip-flop 983 to yield the READ MEMORY RESET synchronization control signal.

The DVTR OUT synchronization control signal of FIG. 6(b) drives the DVTR. The READ CONTROL and WRITE CONTROL synchronization control signals clock memory addresses for i.e., luminance read memory 535 and luminance write memory 536, respectively. Memories 531–536 are addressed by address counters. The address counters are programmed t count up to the number of necessary storage spaces required for conversion. The READ MEMORY RESET and WRITE MEMORY RESET synchronization control signals reset, i.e., luminance read memory 535 and luminance write memory 536, respectively. When a memory is rest by a READ or a WRITE MEMORY RESET synchronization control signal, the signal's associated memory resets to a reference storage space—such as the upper-left corner of the frame.

In the above, the addressed memory can be a random access memory in size dependent upon the number of DVTR lines necessary for a complete sequence of chrominance and luminance lines. instead of a random access memory, the memory can be a sequential address memory. The READ and the WRITE MEMORY RESET pulses from the NAND gates can be used to reset the sequential access memory, the dummy samples illustrated in FIGS. 7 and 8 preferably should be inserted between lines during the time of the horizontal interval. Therefore, from FIG. 7, dummy sample 612 should be inserted between lines 610 and 611 at 612a; dummy sample 614 should be inserted between lines 611 and 613 at 614a; dummy sample 617 should be inserted between either/or lines 613 and 615 or lines 615 and 616 at 61a and/or 617b; dummy sample 619 should be inserted between lines 616 and 618 at 619a; and dummy sample 621 should be inserted between dummy samples 618 and 620 at 621a. By inserting the dummy samples between lines, the dummy samples can be stored in the sequential access memory during the horizontal interval. When using a random access memory, the dummy samples do not need to be placed at the end of a line for they can be randomly accessed or even skipped over by the addressing circuitry at any point in time.

Among the proposed HDTV formats, three exemplary source television formats are described herein. These exemplary source formats are examples for teaching the present invention. They are in no way preferred over each other or over any other source format. The first exemplary source format is representable as 1370 luminance (Y) samples per line of video signal and 685 chrominance (R–Y and B–Y) samples per line of video signal. Proper digital representation for the first exemplary source format may require 1370 samples. This format has an active line time of approximately 17.8 microseconds and a RGB signal bandwidth is 28.9 MHz. Accordingly, the minimum number of samples per active line to accurately reproduce the luminance signal is 2.5×28.9×17.8 or 1286 samples. The factor 2.5 allows for practical Nyquist frequency filter rolloff, corresponding to the 1/0.4 factor discussed elsewhere in this text.

Figure 7:
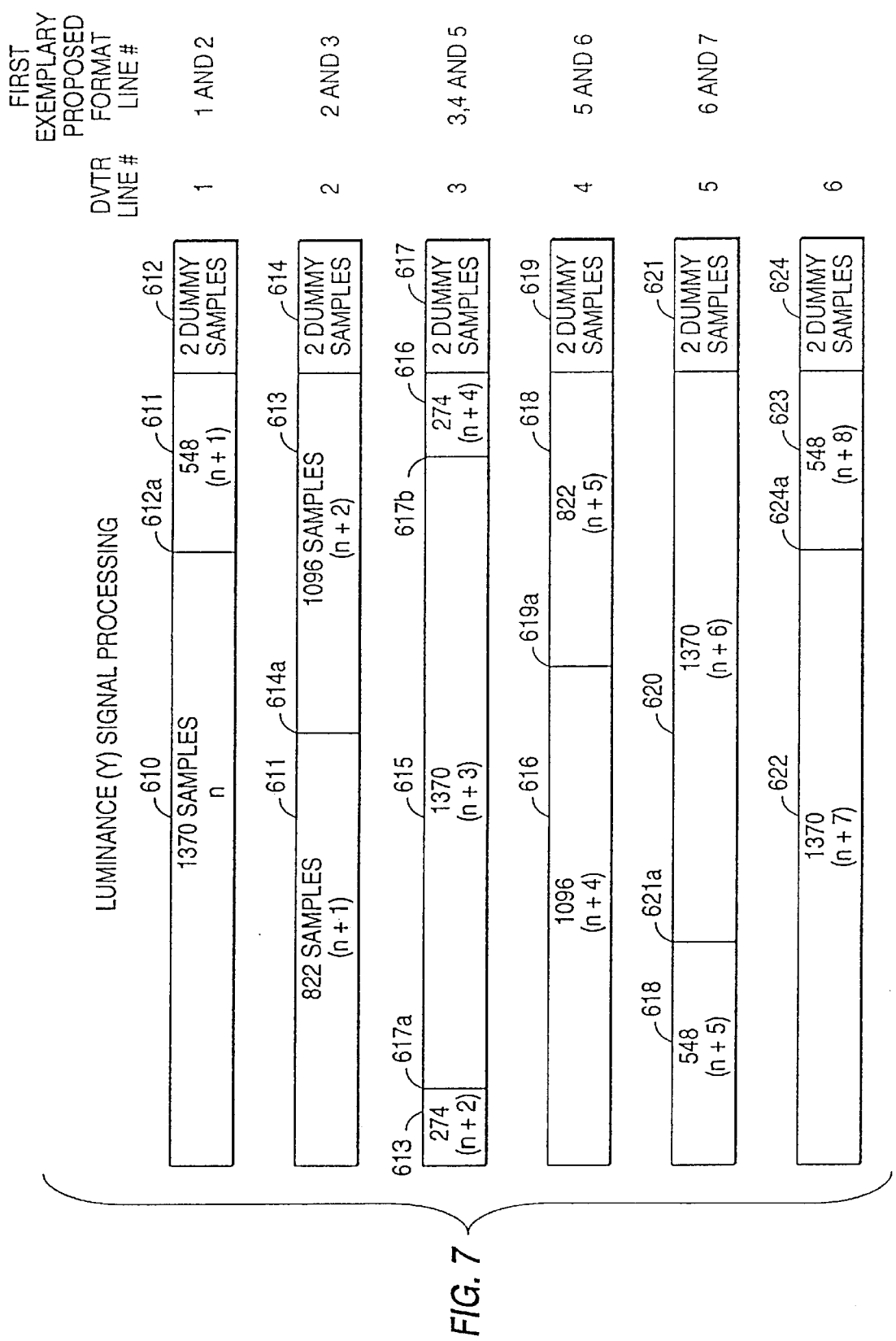
FIG. 7 illustrates seven lines of a first exemplary source television format included in five lines of a digital luminance signal for recording on the recorder.
Figure 8:
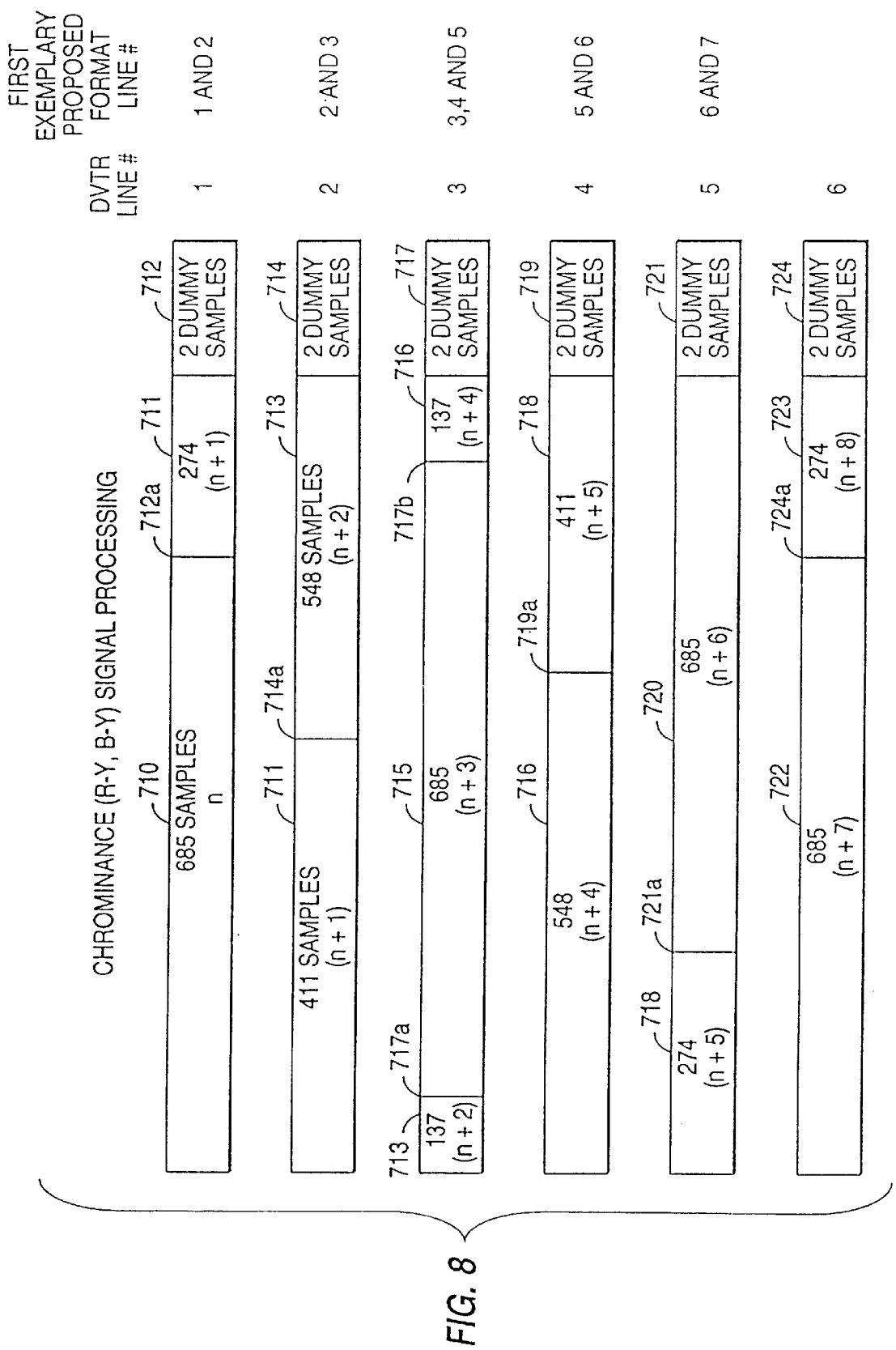
FIG. 8 illustrates seven lines of a first exemplary source television format included in five lines of a digital chrominance signal of the recorder.

In accordance with FIGS. 7 and 8, for the first source HDTV format, the memories 435 and 436 are written into and read out of in a manner corresponding to the 1920 samples per line permitted by the exemplary HDD-1000 DVTR. An entire 1370 sample first luminance line 610, a first portion of 548 samples of a second luminance line 611 and 2 dummy samples 612 make up DVTR line #1, to be stored in memory 435 and 436. A second portion of 822 samples of the second luminance line 611 a first portion of 1096 samples of a third luminance line 613 and 2 dummy samples 614 make up DVTR line #2. A second portion of 274 samples of the third luminance line 613, an entire 1370 sample fourth luminance line 615 and a first portion of 274 samples of a fifth luminance line 616 and 2 dummy samples 617 make up DVTR line #3. A second portion of 1096 samples of the fifth luminance line 616, a first portion of 822 samples of a sixth luminance line 620 and 2 dummy samples make up DVTR line #4. A second portion of 548 samples of the sixth luminance line 618, an entire 1370 sample seventh luminance line and 2 dummy samples make up DVTR line #5. DVTR line #6 begins with a next entire 1370 sample line, thus repeating the above sequence of seven luminance lines every five DVTR lines. The partitioning of luminance lines and the number of dummy samples are chosen to adapt a given number of luminance lines into a given number of DVTR lines and thus have a predictable repeating pattern, thus minimizing memory size.

Alternatively, the dummy samples may be located between lines, especially in the instance of a sequential access memory. Thus, dummy samples 612 may be located at location 612a, dummy samples 614 at location 614a, and so on during the time of the horizontal blanking interval.

FIG. 8 illustrates an 685 sample R–Y or B–Y chrominance line 710 corresponding to 1370 sample luminance line 610 of the first source format illustrated in FIG. 7. FIG. 8 illustrates the conversion of source lines to DVTR lines output of either memories 433 and 434 for B–Y chrominance lines and memories 431 and 432 for R–Y chrominance lines. Because the R–Y and B–Y chrominance lines are multiplexed together by multiplexer 440, the number of samples of each chrominance source line (685 samples) are half that of each luminance source line (1370 samples). Thus, partitioning of the chrominance source lines and the use of dummy samples in FIG. 8 is similar to FIG. 7.

As described in connection with FIG. 7, dummy samples may be inserted between lines at locations 712a, 714a, 717a, 717b, 719a, 721a and so on.

Depending on the source format recorded, any number of dummy samples, including zero dummy samples per line, are possible when the partitioning of source lines is chosen. The dummy samples are not necessary for conveying information but may convey useful information by their use as additional luminance and chrominance data, parity bits, as synchronization bits, as memory row identification bits or the like. For example, the dummy samples can be used to indicate the beginning of each new frame. In the event the DVTR should drop data or lose sync, the dummy sample would permit quick correction of the error. Dummy samples can also be used to indicate the beginning of a new frame when the converted format is interlaced at i=2, for example, for correction in the event of an error.

FIG. 9 illustrates how the seven luminance or chrominance source lines for the first exemplary source format are fit into five DVTR lines. DVTR 110, for example, of FIG. 3 dictates the DVTR lines and display 130, for example, dictates the source lines. Note that after a predetermined number of source or DVTR lines, the source and DVTR line pattern repeats.

FIG. 10 illustrates a second exemplary source format having 2055 samples per line. Note that after a predetermined number of fourteen source lines and fifteen DVTR lines, the pattern repeats. The exemplary source format of FIG. 10 also uses 2 dummy samples per DVTR tape line.

Figure 11A:
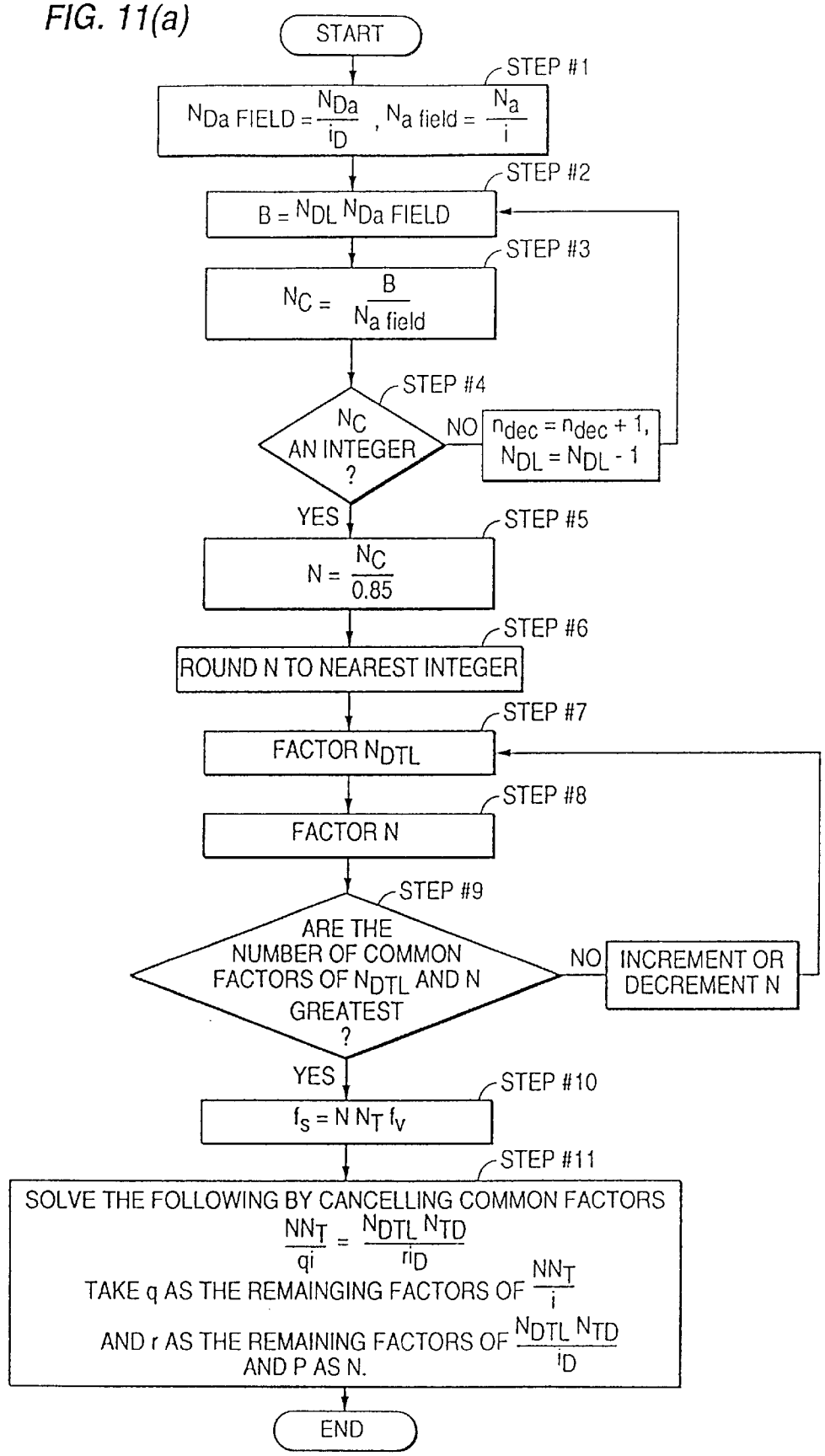
FIGS. 11(a) and (b) are flowcharts describing the structuring of converter parameters for any source format.
Figure 11B:
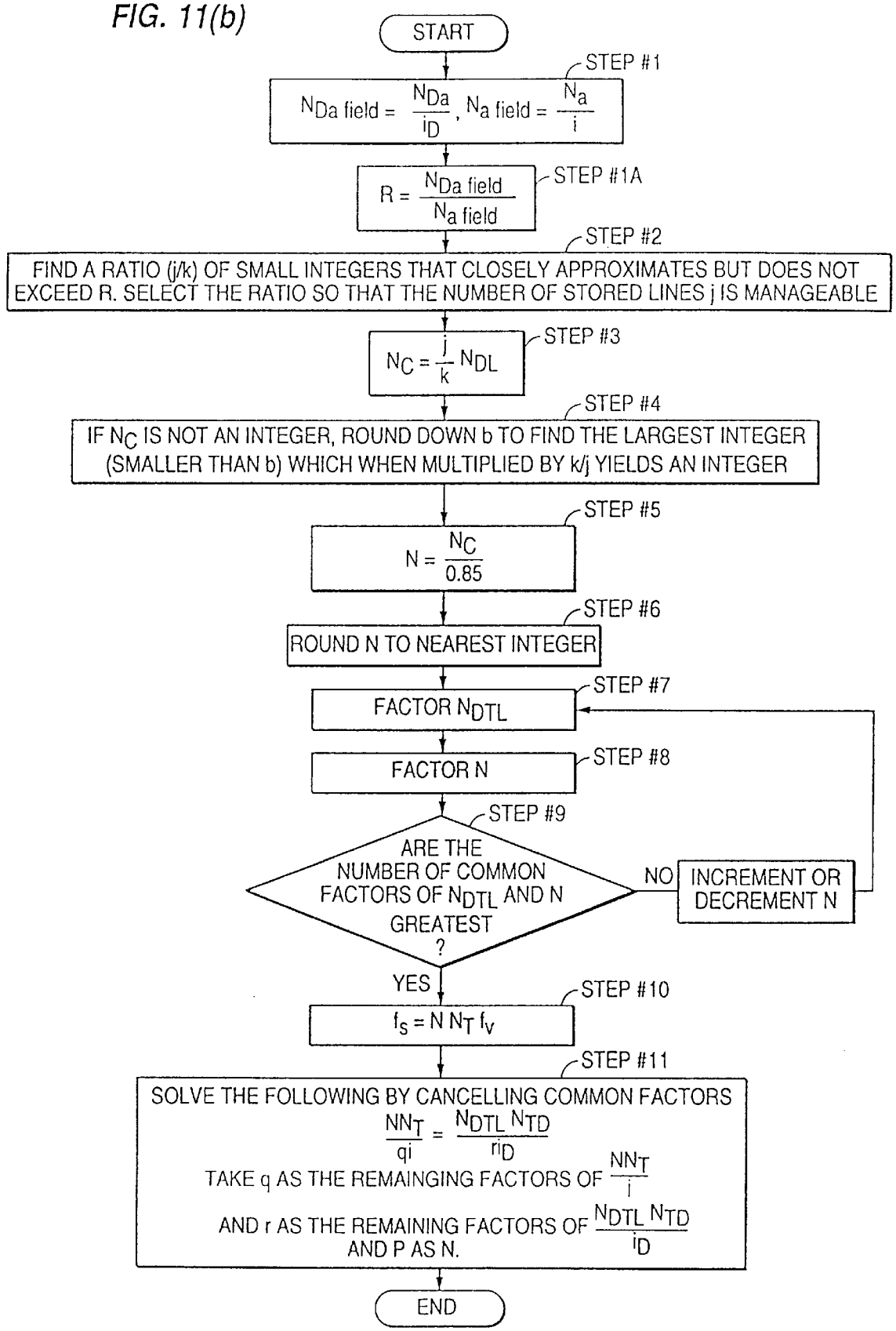

FIG. 11(a) is a flowchart illustrating the following method steps 1–11 according to a first embodiment of FIG. 11(b) is a flowchart illustrating the following method steps 1–11 according to a second embodiment. Any proposed format can be realized in a programmable converter as described below:

DIGITAL VIDEO TAPE RECORDER (DVTR) VARIABLES Given for a DVTR:

1) the number of total lines per frame ($N_{DT}$),
2) the number of active lines per frame ($N_{Sa}$),
3) the number of total luminance samples (bytes) per line ($N_{DTL}$),
4) the number of active luminance samples (bytes) per line ($N_{DL}$),
5) a DVTR field rate (fields per second) equal to the proposed format field rate ($f_{vd}=f_v$),
6) the interlace characteristic of the DVTR [$i_d$ 1:1=1 field/frame 1:2=2 fields/frame 1:3=3 fields/frame . . . ], and
7) $f_{sD}$ number of active luminance samples per second

SOURCE FORMAT VARIABLES

Given for a source format:
a) the number of total lines per frame ($N_T$),
b) the number of active lines per frame ($N_s$),
c) a source format field rate (fields per second) equal to the DVT field rate ($f_v=f_{vd}$),
d) the interlace characteristic of the source format [i 1:1=1 field/frame 1:2=2 fields/frame 1:3=3 fields/frame . . . ], and
e) the minimum number of luminance samples (bytes) per line ($N_L$_/

STEPS FOR DERIVING THE NUMBER OF DUMMY SAMPLES ACCORDING TO A FIRST EMBODIMENT

Step #1, Determine the number of active lines in a field of the DVTR and the number of active lines in a field of the source format.

$$N_{Da\,field} = \frac{N_{Da}}{i_D}$$

$$N_{a\,field} = \frac{N_a}{i}$$

Step #2, Determine the number of active luminance samples (bytes) per field for the DVTR $$B = N_{DL}\,N_{Da\,field}$$

Step #3, Determine the number of active luminance samples of the source format samples (bytes) to arrange on a DVTR active line ($N_c$)

$$N_c = \frac{B}{N_{a\,field}}$$

The result $N_c$, will not always be an integer. $N_c$ must be an integer because a digital sample (byte) can only be an integer, Step #4. If N, is not an integer, decrement $N_{DL}$ by 1 and go to step #2.

When $N_c$ becomes an integer, the number of ties $N_{DL}$ is decremented, $n_{dcc}$, equals the number of dummy samples that will be used on each line.

Preferably, the integer $N_c$ will be an even number as $N_c/2$ will be the number of chrominance samples which preferably is an integer. Even numbers will be easier to divide by two in order to clock the 0.5 $f_s$ chrominance analog-to-digital and digital-to-analog converters. However, if an odd integer $N_c$ is used, the circuitry will tolerate dropping one sample at the edge of every other line. Anti-aliasing low pass filters 421, 422, 521, 522 will also minimize any effects of the dropped half cycle.

$N_c$ thus equals the number of active luminance samples (bytes) 610 of a source active format luminance (Y) line placed on a DVTR line. The number of active samples (bytes) 710 of a source active format chrominance (R–Y) line or (B–Y) line placed on a DVTR line thus equals >$N_c$ because the chrominance component is divided in half by multiplexers 440 and 540 for the chrominance lines. The line arrangements of FIGS. 7 and 8 can thus be determined from the calculated $N_c$ samples (bytes) placed among the repeated lines. The $N_c$ samples are placed among the lines with $n_{dcc}$ dummy samples at the end of each line. Eventually a pattern will repeat over and over after a number of lines (five lines for the first exemplary source format, fourteen lines for the second exemplary source format and five lines for the third exemplary source format).

STEPS FOR DERIVING THE NUMBER OF DUMMY SAMPLES ACCORDING TO A SECOND EMBODIMENT

Step #1, Determine the number of active lines in a field of the DVTR and the number of active lines in a field of the source format.

$$N_{Da\,field} = \frac{N_{Da}}{i_D}$$

$$N_{a\,field} = \frac{N_a}{i}$$

Step #1A, Determine the ratio (R) of active lines in a field of the DVTR to active lines in a field of the source format.

$$R = \frac{N_{Da\,field}}{N_{a\,field}}$$

Step #2, Find a ratio (j/k) of integers that closely approximate but do not exceed R. The ratio should be selected so that the number of stored lines j is manageable.

The source active format lines will be stored in j lines of memory, each line of memory being $N_{DL}$ samples (bytes) in length. As j directly expresses the size of the memory, it is desirable to minimize the value of j. The smaller the ratio j/k, the lesser the cost of the memory. A value for j of at least about 16 is desirable for inexpensive digital construction.

Step #3, Determine the number of active luminance samples (bytes) per active DVTR line.

$$N_c = \frac{jN_{DL}}{k}$$

If $N_c$ is not an integer, some number of d of dummy samples must be added to the real active luminance bytes to comprise a total of $N_{DL}$ active luminance samples (bytes) per active line to be recorded.

Step #4, If $N_c$ is not an integer, round down to find the largest integer (less than b) which when multiplied by k/j yields an integer i.

When $N_c$ becomes an integer, the number of dummy samples d that will be used on each line is $d=N_{DL}-i$.

Now that the memory arrangement and number of dummy samples for each DVTR line has been determined by either of the above embodiments, how to provide oscillators for generating the clock and control signals and how to control the oscillators will be discussed below.

STEPS FOR DERIVING $f_c$, p, q and r

The active portion of a television line is approximately 85% of the total line time.

Step #5, Determine the total number of source format luminance samples to be stored per active DVTR line $$N = \frac{N_c}{0.85}$$

The result, N, will not always be an integer. In order for digital generation, N, must be an integer.

Step #6, Round N to the nearest integer.

In effect, by rounding the approximated 85% blanking time is slightly varied up or down until the nearest integer for N is arrived at.

For accurate PLL oscillator control, a small number of low prime integers are desired to divide the oscillator outputs before comparison in the PLL comparator. The preferred integers are the remaining factors derived from the above divided N and from the number of total luminance samples per line $N_{DTL}$.

Step #7, Factor $N_{DTL}$.

Step #8, Factor N. Check for common factors of $N_{DTL}$ and N.

Step #9, Increment and decrement N and jump to step #7 until the number of common factors of $N_{DTL}$ and N is greatest.

Alternatively, N $N_T$ and $N_{DTL}$ can be factored. Then N can be incremented and decremented until the number of common factors of N $N_T$ and $N_{DTL}$ $N_{DT}$ is greatest.

Step #10, Compute the sampling frequency oscillator rate ($f_s$) in samples per second.

$$f_s = N\,N_T\,f_v$$

The incrementing and decrementing of N should only be performed within reasonable limits in order to provide a frequency for PLL comparison yielding less error than an oscillator PLL driven by dividers of many uncommon factors. If $N=N_{DTL}$, the two oscillators will be at the same frequency and a PLL is not required (i.e., 900 line, 59.94, 1:1, n=1200). Choosing a value for N may be performed in an iterative process until the designed circuit achieves an acceptable cost and accuracy tradeoff.

Step #11, Solve the following equation for q and r by first canceling common factors.

$$\frac{N N_T}{qi} = \frac{N_{DTL} N_{DT}}{r i_D}$$

Then take q as the remaining factors of $(N\ N_T/i)$ and r as the remaining factors of $(N_{DTL}\ N_{DT}/i_D)$.

N itself will be designated p for purposes of FIGS. 6(a) and 6(b), 12(a)–14(b), and 16(a) and 16(b). As discussed in conjunction with FIGS. 6(a) and 6(b), 12(a)–14(b), and 16(a) and 16(b), the remaining factors derived from $N_{DTL}$ and N are thus used as divide by factors p, q, and r for accurate frequency comparison by the phase locked loops.

Also, for purposes of FIGS. 6(a) and 6(b), 12(a)–14(b), and 16(a) and 16(b), $t=N_{DTL}$, $s=f_{sD}/f_v$, and $n=2(N_{T)(P)}$.

THE DVTR VARIABLES DEFINED

The Sony HDD-1000 DVTR and the Hitachi DVTR have the following parameters:

1) $N_{DT}$=1125 total lines per frame
2) $N_{Da}$=1035 active lines per frame
3) $N_{DTL}$=2200 total luminance samples (bytes) per line
4) $N_{DL}$=1920 active luminance samples (bytes) per line
5) $f_v$=59.94 fields per second (or 60.—operator selectable.)
6) $i_D$=2 fields per frame
7) $f_{sD}$=74.175 MHz Other DVTRs can also be used.

STRUCTURING THE CONVERTER PARAMETERS FOR A FIRST EXEMPLARY SOURCE FORMAT ACCORDING TO THE FIRST EMBODIMENT

A first exemplary source format has the following parameters:

a) $N_T$=787.5 total lines per frame
b) $N_a$=720 active lines per frame
c) $f_v$=59.94 fields per second
d) i=1 field per frame Step #1, $N_{Da\ field}=N_{Da}/i_D$=1035 active lines per frame/2 fields per frame=517.5 active lines per field, $N_{a\ field}=N_a/i$=720 active lines per field/1 field per frame=720 active liens per field.

Note that the HDD-1000 DVTR records 1035 active liens per frame as 517 active lines in a first field and 518 active lines in a second field. Nevertheless, $N_{Da\ field}$ is calculated as 517.5 active lines per field for determining converter parameters according to the present invention. Well-known control circuitry is used to store the correct number of active lines in the appropriate DVTR field as required by the HDD-1000 DVTR.

Step #2, $B=N_{DL}\ N_{Da\ field}$=(1920 active luminance samples (bytes) per line) (517.5 active lines per field)=993,600 active luminance samples (bytes) per field.

Step #3, $N_c=B/N_{a\ field}$=(993,600 active luminance samples (bytes) per field)/(720 active liens per field=1380 active luminance samples (bytes) per active line.

Step #4, $N_c$ is thus an integer and $n_{ddc}$=0 dummy samples.

Step #5, $N=N_c/0.85$=(1380 active luminance samples (bytes) per active line)/0.85=1623.592412 total luminance samples (bytes) per active DVTR line.

Step #6, N=1624 total luminance samples (bytes) per active DVTR line, rounded to the nearest integer.

Step #7, $N_{DTL}$=2200=2×2×2×5×5×11.

Step #8, N=1624=2×2×2×7×29. 1624 factors poorly and has few common factors with $N_{DTL}$.

Step #9, increment and decrement N until the number of common factors of $N_{DTL}$ and N is greatest. Take the larger factors of 2200, like 11, 5 and 2. Look for numbers close to 1624 (but not 1624) that have factors with 11, 5, 5 and 2 in them. 550=11×5×2. 2200/550=4. 4−1=3. 1×5×5×2×3=1650. Therefore, an N of 1650 would work. Also, if factors with 11.5 and 5 were tried instead, 275=11×5×5, 2200/275=8, 8−1=7 (seven is not a lowest prime to settle at just yet), 8−2=6=3×2, 11×5×2×3=1650. Therefore, N=1650 is used.

Step #10, $f_s$=N $N_T\ f_v$=(1650 total samples (bytes) per DVTR line) (787.5 total lines per frame) (59.94 fields per second)=77.88461538 MHz.

Step #11, $$\frac{N N_T}{qi} = \frac{N_{DTL} N_{DT}}{r i_D}$$

$$\frac{(1650 - 787.5)}{q(1)} = \frac{(2200)(1125)}{r(2)}$$

$$\frac{(11 \times 5 \times 5 \times 2 \times 3)(1575)}{2q} = \frac{(2 \times 11 \times 5 \times 2 \times 5 \times 2)(1125)}{2r}$$

$$\frac{(11 \times 5 \times 5 \times 2 \times 3)(5 \times 5 \times 3 \times 3 \times 7)}{2q} =$$

$$\frac{(2 \times 11 \times 5 \times 2 \times 5 \times 2)(5 \times 5 \times 5 \times 3 \times 3)}{2r}$$

$$\frac{3 \times 7}{q} = \frac{5 \times 2 \times 2}{r}$$

$$\frac{21}{q} = \frac{20}{r}$$

Figure 12A:
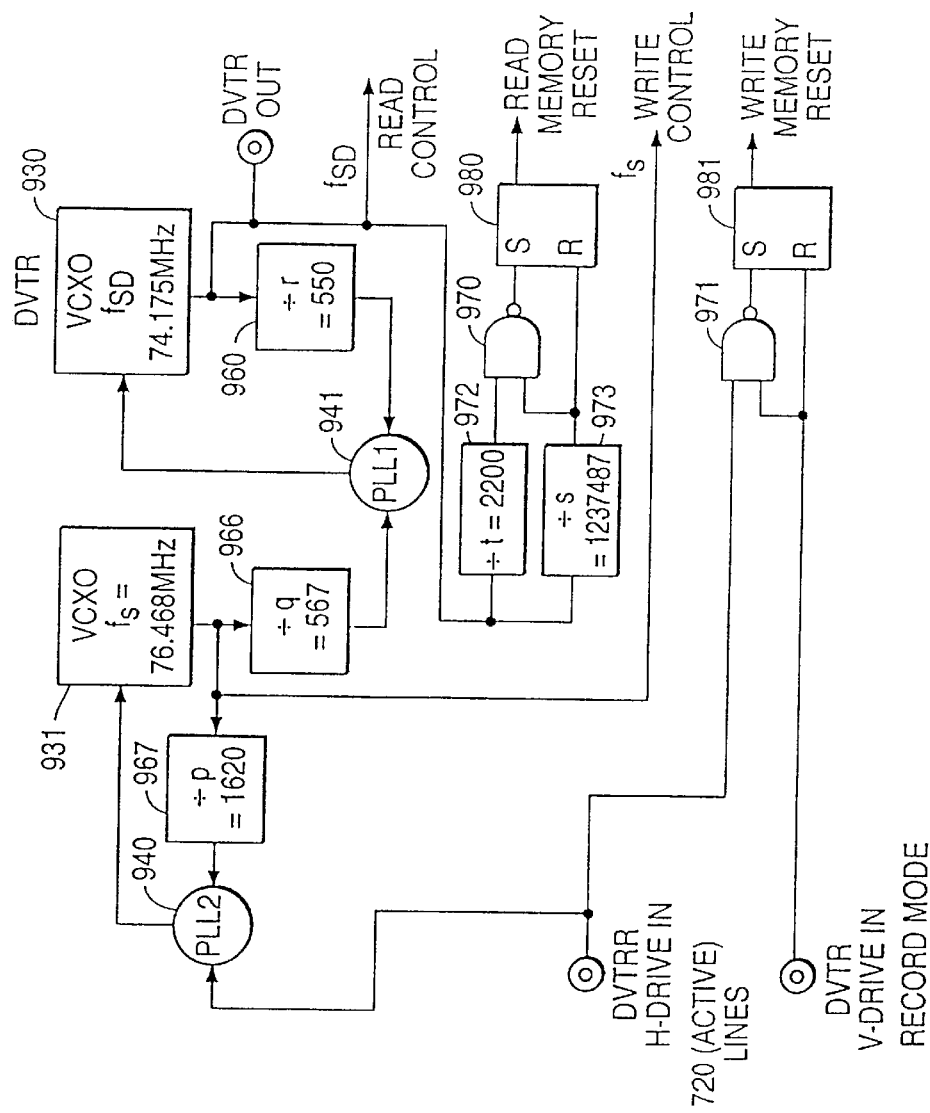
FIGS. 12(a) and (b) are record mode and playback mode block schematic diagrams, respectively, for clock and control oscillators for a first exemplary source format.
Figure 12B:
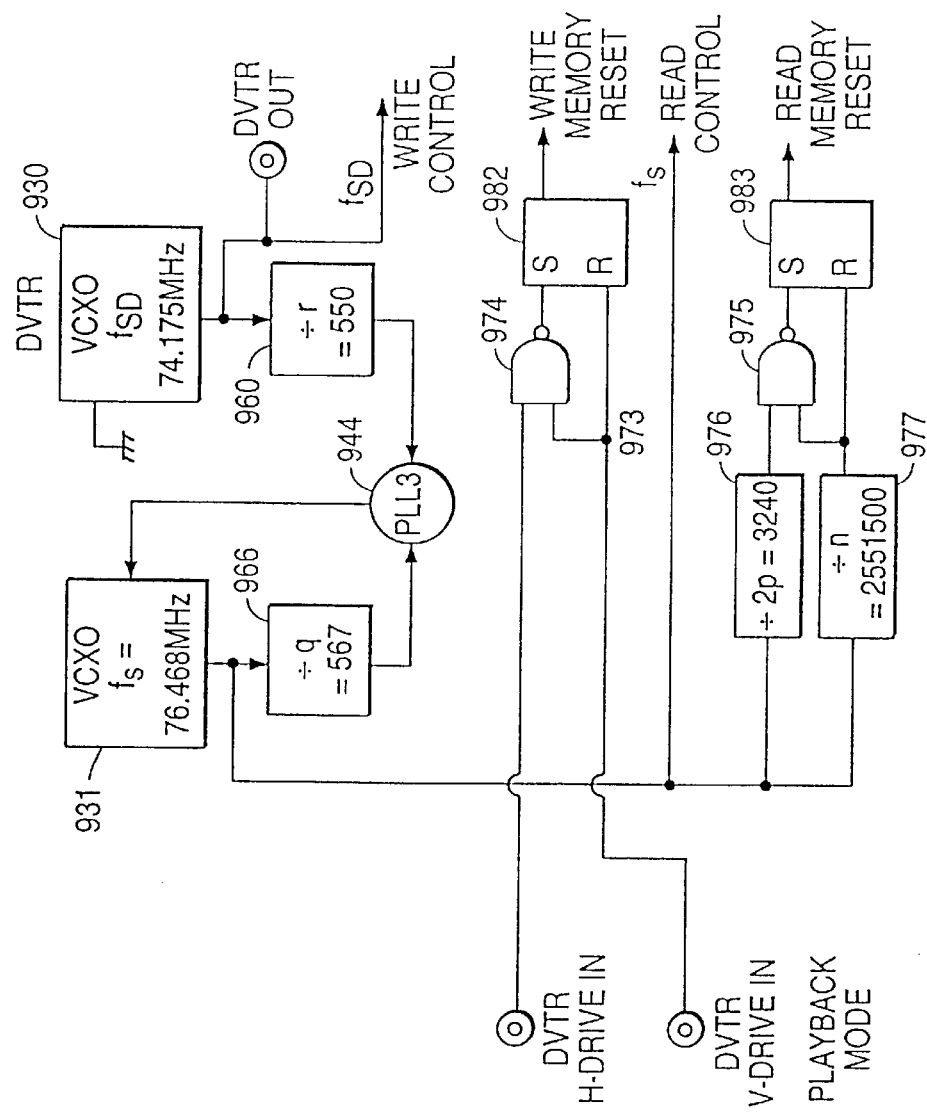

The product of the remaining factors of $(N_{DTL}\ N_{DT}/i_D)$, 5, 2 and 2, equals 20 and is designated r. The product of the uncommon factors N, 3 and 7, equals 21 and is designated q. N itself, 1650, is designated p. The control circuitry can be built for the first source format by conforming the circuitry of FIGS. 6(a) and 6(b) with the above calculated variables. The control circuitry of the preferred embodiment for the first exemplary source format as illustrated in FIGS. 12(a) and 12(b) is built as calculated according to the second embodiment below. In the second embodiment, when j/k is selected as 5/7 instead of 23/32, a smaller memory size is achieved having two dummy samples. Dummy samples may be necessary when converting an interlaced format and/or for alleviating data errors. In a high volume commercial application, the variables determined by the first and second embodiment may need to be varied in order to achieve the lowest necessary memory capacity for the lowest cost per converter. When designing such a converter, an iterative design approach to using the first and second embodiments is necessary for the best tradeoff.

STRUCTURING THE CONVERTER PARAMETERS FOR A FIRST EXEMPLARY SOURCE FORMAT ACCORDING TO THE SECOND EMBODIMENT

Step #1, $N_{da}$ field$=N_{Da}/i_D$=1035 active lines per frame/2 fields per frame=517.5 active lines per field, $N_{a\ field}=N_a/i$=720 active lines per field/1 field per frame=720 lines per field.

Step #1A, $R=j/k=N_{Da\ field}/N_{a\ field}$=517.5/720=0.71875

Step #2, j/k=23/32, select a smaller ratio j/k that approximates 23/32 so that the memory size j is at most 16 (design choice for this example). Let j/k=5/7.

Step #3, $N_c$=(j/k) $N_{DL}$=(5/7) (1920 active luminance samples (bytes) per line)=1371.428571 active luminance samples (bytes) per line.)

Step #4, $N_c$ is not an integer, round down $N_c$ to 1371, (7/5)(1371)=1919.4 which is not an integer, round down $N_c$ to 1370, (7/5) (1370)=1918 which is an integer. Therefore $N_c$=1370 and d=1920−1918=2 dummy bytes per line.

Step #5, N=$N_c$/0.85=(1370 active luminance samples (bytes) per line)/0.85=1611.76406 total luminance samples (bytes) per DVTR line.

Step #6, N=1612 total samples (bytes) per DVTR line, rounded to the nearest integer.

Step #7, $N_{DTL}$=2200=2×2×2×5×5×11.

Step #8, N=1612=2×2×13×31. 1624 factors poorly and has few common factors with $N_{DTL}$.

Step #9, increment and decrement N until the number of common factors of $N_{DTL}$ and N is greatest. Take the larger factors of 2200, like 11.5 and 2. Look for numbers close to 1612 (but not 2200) that have factors with 11, 5, 5 and 2 in them. 550=11×5×5×2. 1612/550=2.93. 11×5×5×2×3=1650. 1650 is not closest. Try numbers that have 5×2×2 in them. 5×2×2=20. 2200/20=100. 1612/20=80.6 5×2×2×81=1620. Therefore N=1620 is used.

Step #10, $f_s$=N $N_T f_v$=(16210 total samples (bytes) per DVTR line) (787.5 total lines per frame (59.94 fields per second)=76.468455 MHz.

Step #11

$$\frac{N N_T}{qi} = \frac{N_{DTL} N_{DT}}{ri_D}$$

$$\frac{(1650 - 787.5)}{q(1)} = \frac{(2200)(1125)}{r(2)}$$

$$\frac{(2 \times 2 \times 5 \times 3 \times 3 \times 3 \times 3)(1575)}{2q} = \frac{(2 \times 11 \times 5 \times 2 \times 5 \times 2)(1125)}{2r}$$

$$\frac{(2 \times 2 \times 5 \times 3 \times 3 \times 3 \times 3)(5 \times 5 \times 3 \times 3 \times 7)}{2q} =$$

$$\frac{(2 \times 11 \times 5 \times 2 \times 5 \times 2)(5 \times 5 \times 5 \times 3 \times 3)}{2r}$$

$$\frac{3 \times 3 \times 3 \times 3 \times 7}{q} = \frac{11 \times 5 \times 2 \times 5}{r}$$

$$\frac{567}{q} = \frac{550}{r}$$

The product of the remaining factors of ($N_{DTL}$ $N_{DT}$/$i_D$), 5, 5, 2 and 11, equals 550 and is designated r. The product of the uncommon factors of N, 3, 3, 3, 3 and 7, equals 567 is designated q. N itself, 1620, is designated p. t=$N_{DTL}$=220, s=$f_{sD}$/$f_v$=1237487, 2p=3240, n=2($N_T$(p)=2(787.5)(1620)=2551500. The control circuitry can be built for the first source format by conforming the circuitry of FIGS. 6(a) and 6(b) with the above calculated variables. FIGS. 12(a) and 12(b) show such circuitry connected per the above calculated values.

STRUCTURING THE CONVERTER PARAMETERS FOR A SECOND EXEMPLARY SOURCE FORMAT ACCORDING TO THE FIRST EMBODIMENT

A second exemplary source format has the following parameters:

a) $N_T$=525 total lines per frame
b) $N_s$=483 active lines per frame
c) $f_v$=59.94 fields per second
d) i=1 field per frame Step #1, $N_{Da\ field}$=$N_{Da}$/$i_D$=1035 active lines per frame/2 fields per frame=517.5 active lines per field, $N_{a\ field}$=$N_a$/i=483 active lines per field/1 field per frame=483 active lines per field.

Step #2, B=$N_{DL}$ $N_{Da\ field}$=(1920 active luminance samples (bytes) per active line (517.5 active lines per field)=993,600 active luminance samples (bytes) per field.

Step #3, repeated $N_c$=B/$N_{a\ field}$=(993,082.5 active luminance samples (bytes) per field)/(483 active lines per field) =2056.07149 active luminance samples (bytes) per active line.

Step #4, repeated, $N_c$ is not an integer. Again decrement $N_{DL}$ by 1, $N_{DL}$=1918 active luminance samples (bytes) per active line and $n_{dcc}$=2. Go back to step #2.

Step #2, repeated again, B=$N_{DL}$ $N_{Da\ field}$=(1918 active luminance samples (bytes) per active line (517.5 active lines per field)=992,565 active luminance samples (bytes) per field.

Step #3, repeated again, $N_c$=B/$N_{a\ field}$=(992,565 active luminance samples (bytes) per field)/(483 active lines per field)=2055 active luminance samples (bytes) per active line. Therefore, $n_{dcc}$=2 and there will be two dummy samples (bytes). $N_c$=2055 samples of a source format luminance (Y) line will be placed on the $N_{DL}$=1920 sample DVTR line by placing 1920 active luminance samples on a first DVTR line and 2055−1920=135 active luminance samples on a second DVTR line. The number of chrominance R−Y placed will be >$N_c$=1027 samples and chrominance B−Y will be also >$N_c$=1027 samples (one half a sample is dropped due to an odd $N_c$).

Step #5, N=$N_c$/0.85=(2055 active luminance samples (bytes) per active line)/0.85=2417.647059 total luminance samples (bytes) per active DVTR line.

Step #6, N=2418 total luminance samples (bytes) per DVTR line, rounded to the nearest integer.

Step #7, $N_{DTL}$=2200=2×2×2×5×5×11.

Step #8, N=2418=2×3×13×31.2418 factors poorly and has few common factors with $N_{DTL}$.

Step #9, increment and decrement N until the number of common factors of $N_{DTL}$ and N is greatest. Take the larger factors of 2200, like 11, 5 and 2. Look for numbers close to 2418 (but not 2200) that have factors with 11, 5 and 2 in them. 550=11×5×5×2. 2200/550=4. 4+1=5. 11×5×5×2×5= 2750. Therefore, an N of 2750 would work. But, a number closer to 2418 is preferred. Look for numbers close to 2400 (but not 2200) that have factors with 2×2×5×5 in them. 200=2×2×2×5×5. 2200/200=11. 11−1=10=2×5. 2×2×2×5× 2×5=2000. 11+1=12=3×2×2. 2x 2×2×5×5×3×2×2=2400. 2400 is very close to 2418. Therefore N=2400.

Step #10, $f_s$=N $N_T$ $F_v$=(2400 total samples (bytes) per line) (525 total lines per frame)(59.94 fields per second)= 75.52447552 MHz.

Step 11, $$\frac{N N_T}{qi} = \frac{N_{DTL} N_{DT}}{ri_D}$$

$$\frac{(2400)(525)}{q(1)} = \frac{(2200)(1125)}{r(2)}$$

$$\frac{(2 \times 2 \times 2 \times 5 \times 5 \times 3 \times 2 \times 2)(5 \times 5 \times 7 \times 3)}{2q} =$$

$$\frac{(2 \times 11 \times 5 \times 2 \times 5 \times 2)(5 \times 5 \times 5 \times 3 \times 3)}{r(2)}$$

$$\frac{2 \times 2 \times 2 \times 7}{q} = \frac{11 \times 5}{r}$$

$$\frac{56}{q} = \frac{55}{r}$$

The product of the uncommon factors of ($N_{DTL}$ $N_{DT}$/$i_D$), 11 and 5, equals 55 and is designated r. The product of the uncommon factors of (N $N_T$/i), 2, 2, 2 and 7, equals 56 and is designated q. N itself, 2400, is designated p. t=$N_{DTL}$−

Figure 13A:
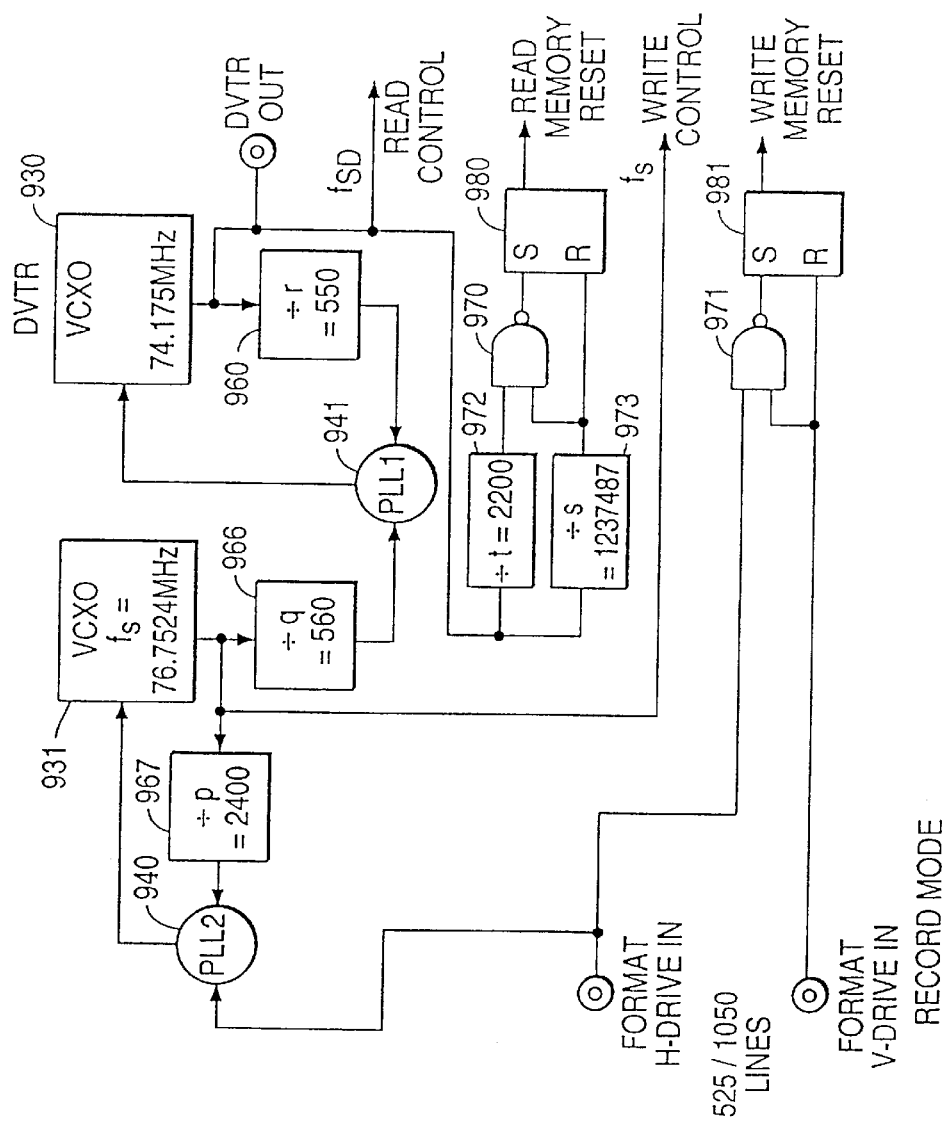
FIG. 13(a) and (b) are record mode and playback mode block schematic diagrams, respectively, for clock and control oscillators for a second exemplary source format.
Figure 13B:
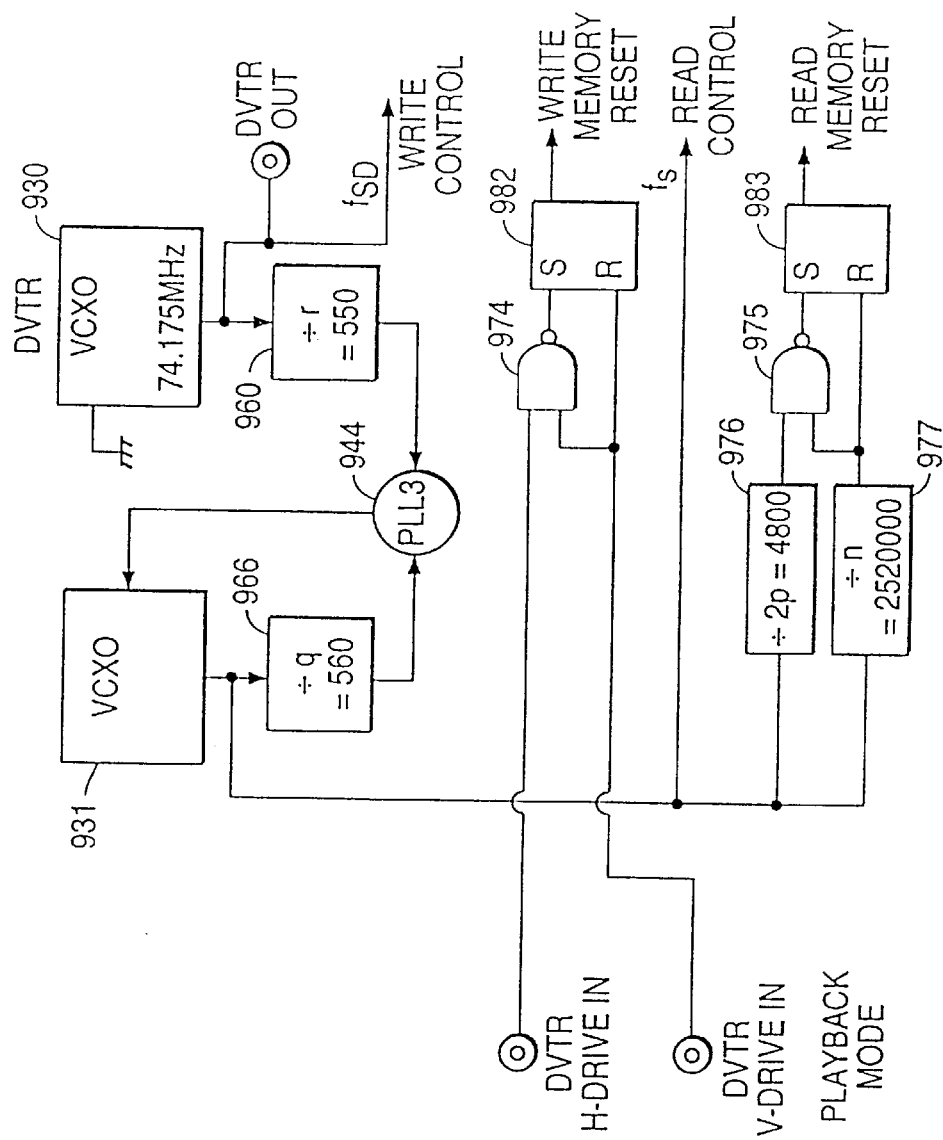

2200, s=$f_{sD}/f_v$=1237487, 2p=4800=2($N_T$)(p)=2(525)(2400) =2520000. The control circuitry can be built for the second source format by conforming the circuitry of FIGS. 6(a) and 6(b) per the above calculated values. FIGS. 13(a) and 13(b) show such circuitry connected as calculated above except that, to save costs in the preferred embodiment, the values of q and r have been multiplied by ten so that r=550 for both the first and second exemplary source formats. Multiplying the values of q and r by ten, however, will decrease the frequencies compared at PLL1 941 and PLL3 thus decreasing the frequency control stability.

STRUCTURING THE CONVERTER PARAMETERS FOR A SECOND EXEMPLARY SOURCE FORMAT ACCORDING TO THE SECOND EMBODIMENT

Step #1, $N_{Da\ field}$=$N_{Da\ field}/i_D$=1035 active lines per frame/2 fields per frame –517.5 active lines per field, $N_a$ $_{field}$=$N_a/i$=483 active lines per field/1 field per frame=483 active lines per field.

Step #1, R=$N_{Da\ field}/N_{a\ field}$=51.5/483=1.071428571.

Step #2, j/k=15/14. j=15 stored lines is a manageable number.

Step #3, $N_c$=(j/k) $N_{DL}$=(15/14) (1920 active luminance samples (bytes) per line)=2057.142857 active luminance samples (bytes) per line.

Step #4, $N_c$ is not an integer. 2057×(14/15)=1919.866667. 2056×(14/15)=1918.933333. 2055×(14/15)=1918. Therefore, $N_c$=2055 active luminance samples (bytes) per line and d=1920–1918=2 dummy samples per line.

Step #5, N=$N_c$/0.85=(1918 active luminance samples (bytes) per line)/0.85=2417.647059 total luminance samples (bytes) per DVTR line.

Step #6, N–2418 total samples (bytes) per DVTR line, rounded to the nearest integer.

Step #7, $N_{DTL}$=2200=2×2×2×5×5×11.

Step #8, N=2418=2×3×13×31. 2418 factors poorly and has few common factors with $N_{DTL}$.

Step #9, increment and decrement N until the number of common factors of $N_{DTL}$ and N is greatest. Take the larger factors of 2200, like 11, 5 and 2. Look for numbers close to 2418 (but not 2200) that have factors with 11, 5, 5 and 2 in them. 550=11×5×5×2. 2418/550=4.3966. 11×5×5×2×4= 2200. 11×5×5×2×5=2750. But, a number closer to 2418 is preferred. Also, if factors with 11, 5, 2 and 2 were tried instead, 220=11×5×2×2, 2418/220=10.9909. 11×5×2×2× 11=2420. We have few common factors with 11. Look for numbers close to 2418 (but not 2200) that have 2, 2, 2, 2, 2, 3 in them. 2×2×2×2×2×3=96. 2418/96=24.1875. 24=3×2× 2×2, 2×2×2×2×2×3×3×2×2×2=2304. Try for a higher number of common factors. Up to 24 to 25. 25=5×5. We need fives. 2×2×2×2×2×3×5×5=2400.

Step #10, $f_s$=N $N_T f_v$=(2400 total samples (bytes) per DVTR line) (525 total lines per frame) (59.94 fields per second)=75.52447552 MHz.

Step 11, $$\frac{N N_T}{qi} = \frac{N_{DTL} N_{DT}}{r i_D}$$

$$\frac{(2400)(525)}{q(1)} = \frac{(2200)(1125)}{r(2)}$$

-continued $$\frac{(2 \times 2 \times 2 \times 5 \times 5 \times 3 \times 2 \times 2)(5 \times 5 \times 7 \times 3)}{q}$$

$$\frac{(2 \times 11 \times 5 \times 2 \times 5 \times 2)(5 \times 5 \times 5 \times 3 \times 3)}{r(2)}$$

$$\frac{2 \times 2 \times 2 \times 7}{q} = \frac{11 \times 5}{r}$$

$$\frac{56}{q} = \frac{55}{r}$$

The product of the common factors $N_{DTL}$ $N_{DT}/i_D$), 11 and 5, equals 55 and is designated r. The product of the uncommon factors (N $N_T/i$), 2, 2, 2 and 7, equals 56 and is designated q. N itself, 2400, is designated p. t=$N_{DTL}$=2200. s=$f_{sD}/f_v$=1237487, 2p=4800, n=2($N_T$)(p)=2(525)(2400)= 2520000. The control circuitry can be built for the second source format by conforming the circuitry of FIGS. 6(a) and 6(b) per the above calculated values. FIGS. 13(a) and 13(b) show such circuitry connected as calculated above except that, to save costs in the preferred embodiment, the values of q and r have been multiplied by ten so that r–550 for both the first and the second exemplary source formats. Multiplying the values of q and r by ten, however, will decrease the frequencies compared at PLL1 941 and PLL3 944 thus decreasing frequency control stability.

STRUCTURING THE CONVERTER PARAMETERS FOR A THIRD EXEMPLARY SOURCE FORMAT ACCORDING TO THE FIRST EMBODIMENT

A third source format has the following parameters:

a) $N_T$=900 total lines per frame
b) $N_a$=828 active lines per frame
c) $f_v$=59.94 fields per second
d) i=1 field per frame Step #1, $N_{Da\ field}$=$N_{Da}/i_D$=1035 active lines per frame/2 fields per frame=517.5 active lines per field, $N_{a\ field}$=$N_a/i$= 828 active lines per field/1 field per frame=828 active lines per field.

Step #2, B=$N_{DTL}$ $N_{Da\ field}$=(1920 active luminance samples (bytes) per line) (517.5 active lines per field)=993, 600 active luminance samples (bytes) per field.

Step #3, $N_c$=B/$N_{a\ field}$=(993,600 active luminance samples (bytes) per field)(828 active lines per field)=1200 active luminance samples (bytes) per active line.

Step #4, $N_c$ is an integer, therefor $n_{dcc}$=0 and there will be no dummy samples (bytes). $N_c$=1200 active luminance samples of a proposed format luminance (Y) line will be placed on a $N_{DL}$=1920 active luminance sample DVTR line. The number of chrominance R–Y placed will be >$N_c$=600 samples and chrominance B–Y will be also >$N_c$=600 samples.

Step #5, N=$N_c$/0.85=(1200 active luminance samples (bytes) per line(/0.85=1411.764706 total luminance samples (bytes) per DVTR line.

Step #6, N=1412 total luminance samples (bytes) per DVTR line, rounded to the nearest integer.

Step #7, $N_{DTL}$=2200=2×2×2×5×5×11.

Step #8, N=1412=2×2×353. 1412 factors poorly and has few common factors with $N_{DTL}$.

Step #9, increment and decrement N until the number of common factors of $N_{DTL}$ and N is greatest. Take the larger factors of 2200, like 11, 5 and 2. Look for numbers close to 1412 (but not 2200) that have factors with 11, 5, 5 and 2 in them. 550=11×5×5×2. 2200/550=4. 4−1=3. 311×5×5×2×3=1650. Therefore, an N of 1650 would work. But, a number closer to 1412 is preferred. Also, if factors with 11, 5 and 5 were tried instead, 275=11×5×5, 2200/275=8, 8−1=7 (seven is not a lowest prime to settle at just yet), 8−2=6=3×2, 11×5×5×3×2=1650. If we used 8−3 then 11×5×5×5=1375 which would work better since it is very close to 1412. Therefore, N=1375 is used and in fact yields an $f_s$ equal to the DVTR clock, and thus oscillator 931 is not needed for this format. This simplifies the circuitry and eliminates any jitter associated with two phase locked loops in cascade.

Step #10, $f_s$=N $N_T$ $f_v$=(1375 total luminance samples (bytes) per DVTR line) (900 total lines per frame) (59.94 fields per second)=74.17582418 MHz.

Step 11, $$\frac{N N_T}{qi} = \frac{N_{DIL} N_{DT}}{ri_D}$$

$$\frac{(1375)(900)}{q(1)} = \frac{(2200)(1125)}{r(2)}$$

$$\frac{(11 \times 5 \times 5 \times 5)(3 \times 3 \times 5 \times 5 \times 2 \times 2)}{q} =$$

$$\frac{(2 \times 11 \times 5 \times 2 \times 5 \times 2)(5 \times 5 \times 5 \times 3 \times 3)}{r(2)}$$

$$\frac{1}{q} = \frac{1}{r}$$

Figure 14A:
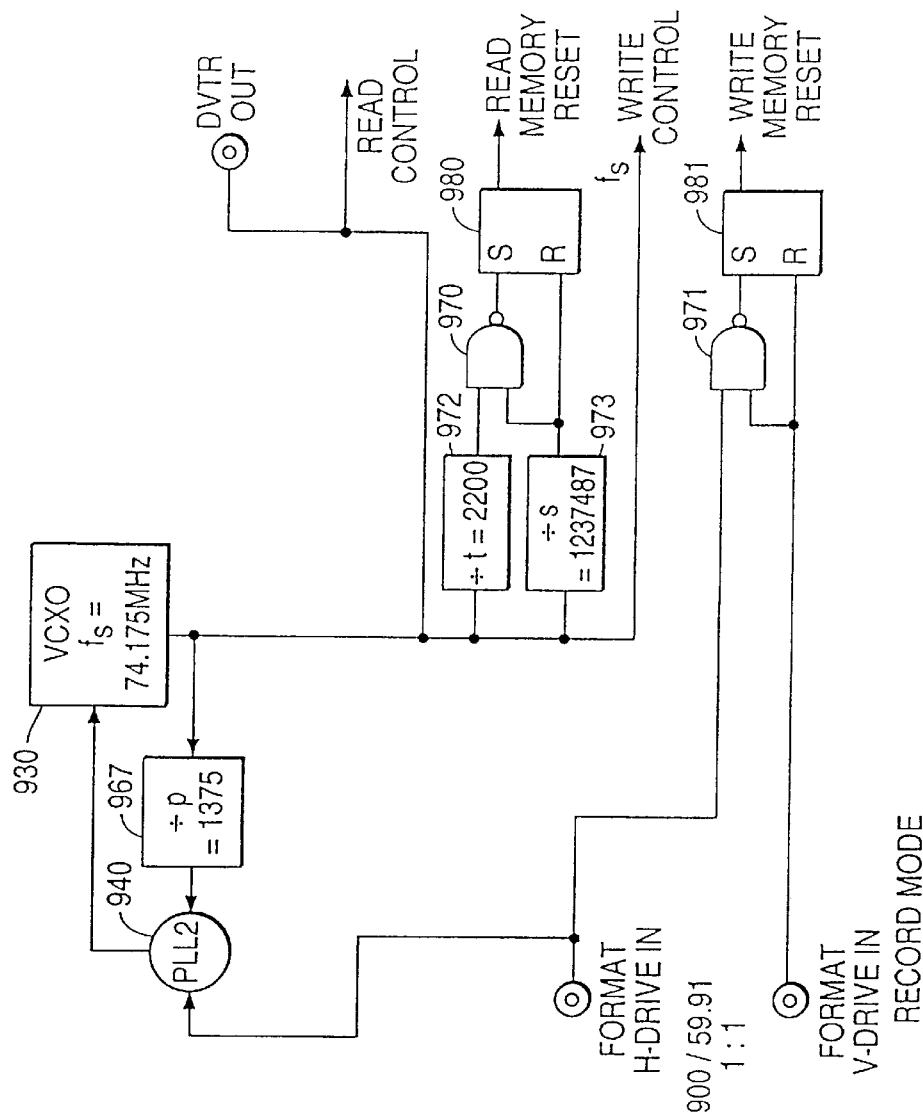
FIGS. 14(a) and (b) are record mode and playback mode block schematic diagrams, respectively, for a clock and control oscillator for a third exemplary source format.
Figure 14B:
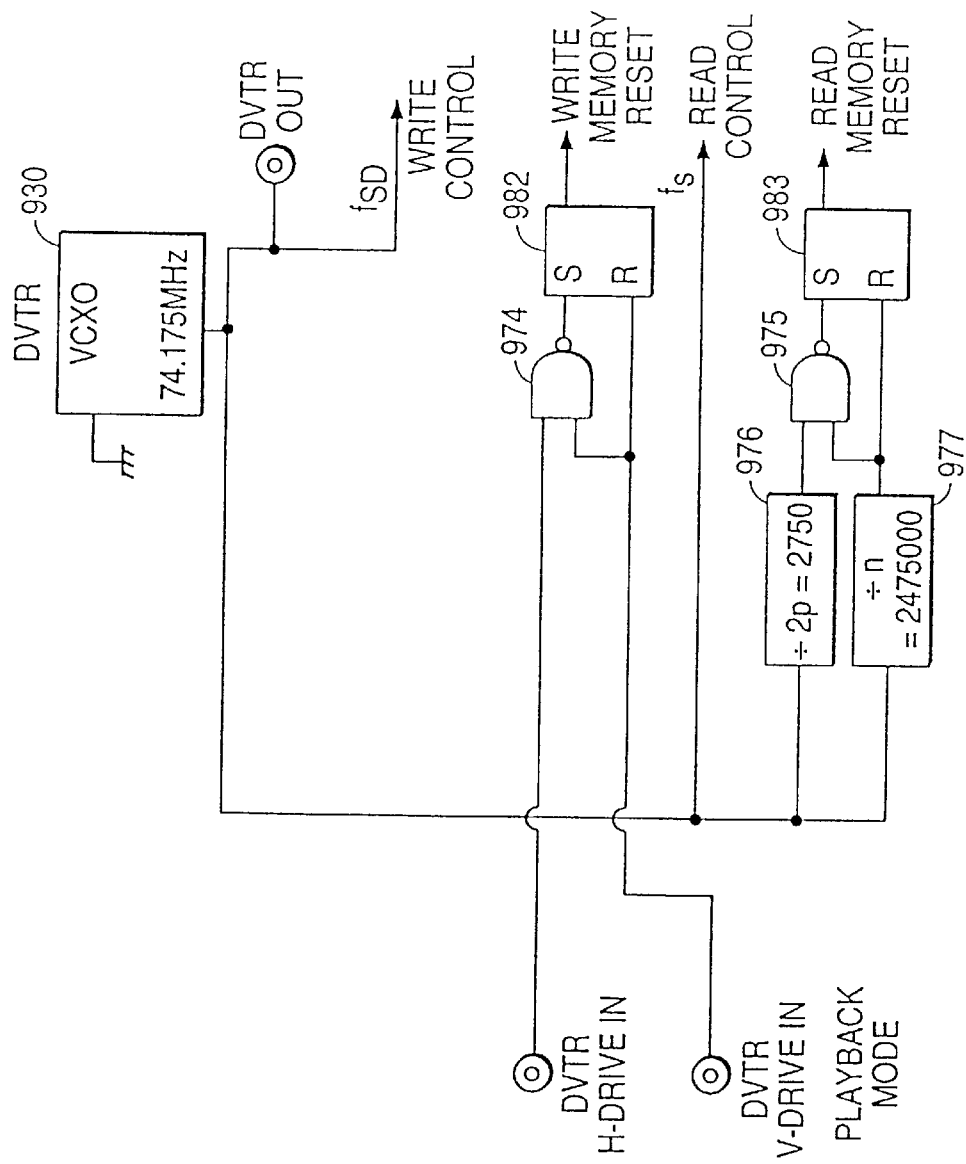

There are no remaining factors. Hence q=r=1 and $f_s$=74.17582418 MHz which is the same sampling frequency as the DVTR. Oscillators 930 and 931 can be the same oscillator. N itself, 1375, is designated p. t=$N_{DTL}$=2200, s=$f_{sD}/f_v$=123787, 2p=2750, n=2($N_T$)(p)=2(900)(1375)=2475000. The control circuitry can be built for the second source format by conforming the circuitry of FIGS. 6(a) and 6(b) per the above calculated values. FIGS. 14(a) and 14(b) show such circuitry connected as calculated above.

STRUCTURING THE CONVERTER PARAMETERS FOR A THIRD EXEMPLARY SOURCE FORMAT ACCORDING TO THE SECOND EMBODIMENT

Step #1, $N_{Da\ field}$=$N_{Da}/i_D$=1035 active lines per frame/2 fields per frame=517.5 active lines per field, $N_{a\ field}$=$N_a/i$=828 active lines per field/1 field per frame=828 active lines per field.

Step #1A, R=$N_{Da\ field}/N_{a\ field}$=517.5/828=0.625.

Step #2, j/k=5/8. j=5 lines is a manageable number.

Step #3, $N_c$=(j/k) $N_{DL}$=(5/8)(1920 active luminance samples (bytes) per line)=1200 active luminance samples (bytes) per line.

Step #4, $N_c$ is an integer. Therefore, $N_c$=1200 active luminance samples (bytes) per line and d=0 dummy samples per line.

Step #5, N=$N_c$/0.85=(1200 active luminance samples (bytes) per line(/0.85=1411.764706 total luminance samples (bytes) per DVTR line.

Step #6, N=1412 total luminance samples (bytes) per DVTR line, rounded to the nearest integer.

Step #7, $N_{DTL}$=2200=2×2×2×5×5×11.

Step #8, N=1412=2×2×353. 1412 factors poorly and has few common factors with $N_{DTL}$.

Step #9, increment and decrement N until the number of common factors of $N_{DTL}$ and N is greatest. Take the larger factors of 2200, like 11, 5 and 2. Look for numbers close to 1412 (but not 2200) that have factors with 11, 5, 5 and 2 in them. 550=11×5×5×2. 2200/550=4. 4−1=3. 11×5×5×2×3=1650. Therefore, an N of 1650 would work. But, a number closer to 1412 is preferred. Also, if factors with 11, 5 and 5 were tried instead, 275=11×5×5, 2200/275=8, 8−1=7 (seven is not a lowest prime to settle at just yet), 8−2=6=3×2, 11×5×5×3×2=1650. If we used 8−3=5 then 11×5×5×5=1375 which would work better since it is very close to 1412. Therefore, N=1375 is used and in fact yields an $f_s$ equal to the DVTR clock, and thus oscillator 931,932 is not needed for this format.

Step #10, $f_s$=N $N_T$ $f_v$=(1375 total samples (bytes) per DVTR line) (900 total lines per frame) (59.94 fields per second)=74.17582418 MHz.

Step 11, $$\frac{N N_T}{qi} = \frac{N_{DIL} N_{DT}}{ri_D}$$

$$\frac{(1375)(900)}{q(1)} = \frac{(2200)(1125)}{r(2)}$$

$$\frac{(11 \times 5 \times 5 \times 5)(3 \times 3 \times 5 \times 5 \times 2 \times 2)}{q} =$$

$$\frac{(2 \times 11 \times 5 \times 2 \times 5 \times 2)(5 \times 5 \times 5 \times 3 \times 3)}{r(2)}$$

$$\frac{1}{q} = \frac{1}{r}$$

There are no remaining factors. Hence q=r=1 and $f_s$=74.17582418 MHz which is the same sampling frequency as the DVTR. Oscillators 930 and 931 can be the same oscillator. N itself, 1375, is designated p. t=$N_{DTL}$=2200, s=$f_{sD}/f_v$=1237487, 2p=2750, n=2($N_T$)(p)=2(900)(1374)=2475000. The control circuitry can be built for the second source format by conforming the circuitry of FIGS. 6(a) and 6(b) per the above calculated values. FIGS. 14(a) and 14(b) show such circuitry connected as calculated above.

The record mode and playback mode circuits of FIGS. 6(a) and 6(b) can be combined using switches to connect plural components (such as oscillators 931, 932, 933 or 934) according to the desired mode. Furthermore, the circuits of FIGS. 12(a) and 12(b) through 14(a) and 14(b) can be combined with switches to select a format to convert. Furthermore, the dividers can be programmable dividers to aid switching between source formats. The above-mentioned switches and dividers can be substituted with a program controlled processor wherein source format data are entered, parameters are calculated by the above embodiment steps and clock and control signals are generated. It is also important to note that the record/playback circuitry of FIGS. 4 and 5 can share common components. For instance, it is preferred they share the same DVTR and controller. It is also preferred they share the same memories.

TRANSFERRING A MOTION PICTURE FILM IMAGE TO DIGITAL MAGNETIC TAPE

The present invention is suitable for transferring motion pictures to digital magnetic tape for archival purposes without cropping the film image. Preferably, a non-interlaced, progressive scan luminance and chrominance output signal from a telecine, having a frame rate of 24 frames per second, is digitized as 1920 active samples per line and 1290 active lines per film frame. This provides a source format having the following parameters:

a) $N_T$=1290 total lines per frame
b) $N_a$=1290 active lines per frame
c) $f_v$=24 fields per second
d) i=1 field per frame Since motion picture film has a field rate of 1 field per frame, the frame rate of the film will be used in the following discussion.

The present invention can store this format on a DVTR using a conversion technique which is slightly different from the conversion technique described thus far. Generally, the conversion technique described above utilizes digital borrowing and carrying of active samples between source format lines to form complete DVTR lines (with any dummy samples, of course).

FIG. 7 shows that DVTR line 1 stores 1370 active samples 610 from line 1 of the first exemplary source format are stored with 548 "borrowed" samples 611 from line 2. Two dummy samples 612 are added to these active samples to complete DVTR line 1. In DVTR line 2, 822 "carried" active samples 611 of source format line 2 are stored with 1096 samples 613 of source format line 3 (plus 2 dummy samples 614). DVTR line 3 stores 274 "carried" samples 613 from source format line 3, all 1370 samples 615 of source format line 4, and 274 "borrowed" samples 616 from source format line 5 (again, plus 2 dummy samples 617). DVTR line 4 stores 1096 "carried" samples 615 from source format line 5 and 822 "borrowed" samples 618 from source format line 6 along with 2 dummy samples 619. DVTR line 5 holds 548 "borrowed" samples 618 from source format line 6 and all 1370 samples 620 of source format line 7, plus 2 dummy samples 621. DVTR line 6 shows the same arrangement of samples as stored in DVTR line 1, indicating that the pattern repeats.

For the conversion technique describe above, no borrows or carries extend across field boundaries of the source format. That is, the number of samples from a source format line selected to be stored on a DVTR line is such that one complete source format field is stored without borrowing or carrying any samples from an adjacent field. The conversion technique that follows borrows and carries lines between fields in much the same way as samples are borrowed and carried between lines of the source format.

It turns out that 2 frames (fields) of the film are conveniently stored within 5 fields of the DVTR format. Since the field rate of the DVTR is 2.5 times the frame rate of the film, to store 2 frames of film in 5 files of the DVTR, (1290 active lines per film frame)/(2.5 DVTR fields per film frame)=516 active lines should be stored in each DVTR field. As previously mentioned, a frame of the DVTR is stored at 1035 lines within 2 fields, where 517 lines are stored in the first field and 518 lines are stored in the second field. The 516 film lines per DVTR field can be conveniently stored by including 1 dummy line with the first DVTR field and 2 dummy lines with the second DVTR field.

Figure 15:
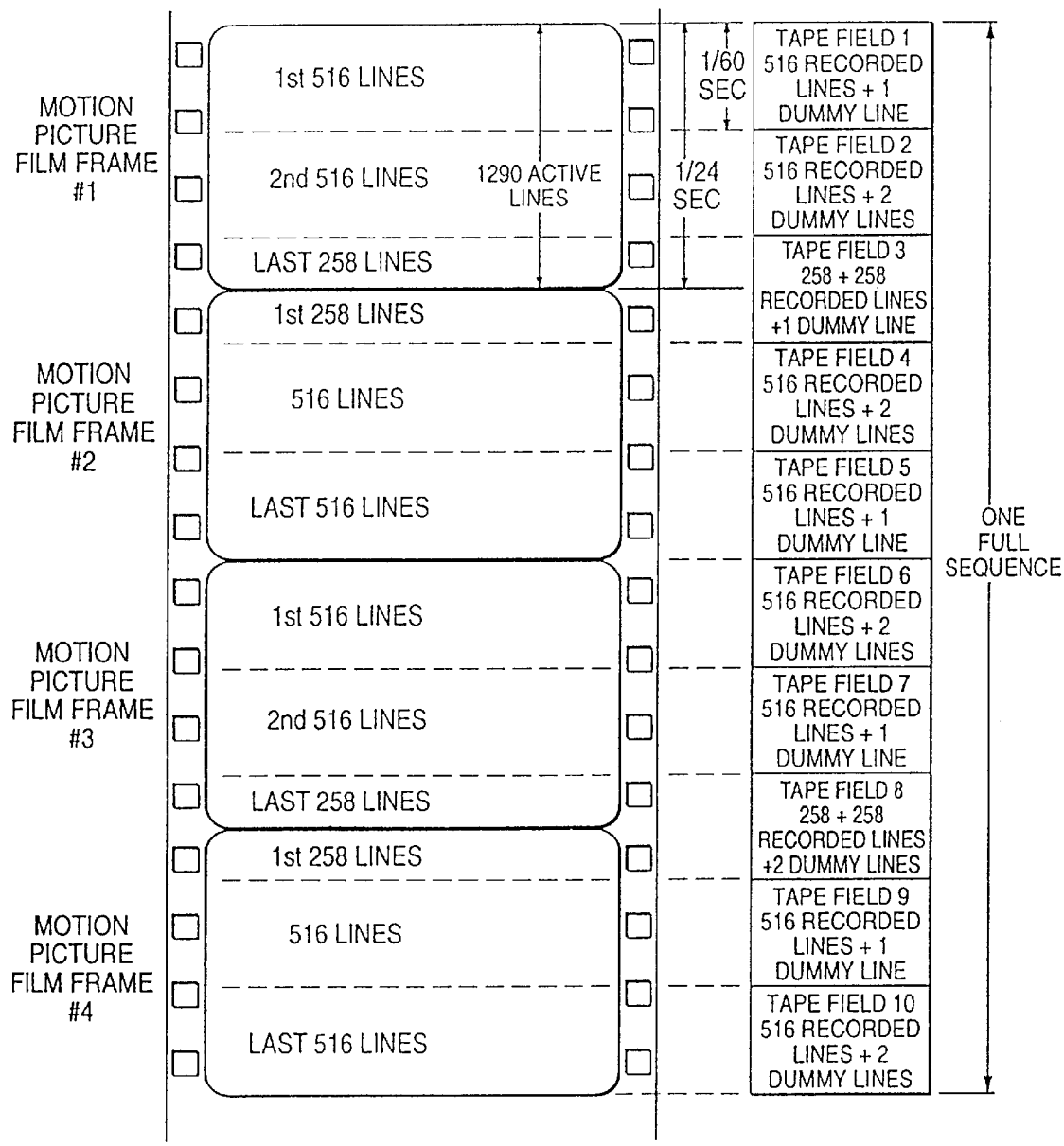
FIG. 15 illustrates how lines of frames of a motion picture film image are arranged in the lines of fields of a digital video recorder.

FIG. 15 shows a sequence of 516 lines from 2 consecutive film frames being stored in 5 consecutive DVTR fields. The first 516 lines of the first film frame plus 1 dummy line are stored in the 517 lines of the first DVTR field. The next 516 lines of the first film frame plus 2 dummy lines are stored in the 518 lines of the second DVTR field. The remaining 258 lines of the first film frame and the first 258 lines of the second film frame plus 1 dummy line are stored in the third DVTR field. The next 516 lines of the second film frame plus 2 dummy lines are stored in the fourth DVTR field. The remaining 516 lines of the second film frame plus 1 dummy line are stored in the fifth DVTR field.

The dummy lines are used to carry film frame identification data for reconstructing the film image and to facilitate editing. The dummy lines associated with a DVTR field in which 258 lines of two consecutive film frames are stored will contain frame identification data for both film frames. The frame identification data can be stored in the dummy lines in a highly redundant manner for an improved reconstruction error rate.

STRUCTURING THE CONVERTER PARAMETERS FOR CONVERTING A MOTION PICTURE FILM IMAGE TO A FORMAT FOR DIGITAL MAGNETIC RECORDING ACCORDING TO THE FIRST EMBODIMENT

Using the variables defined for the Sony HDD-1000 DVTR and for the telecine source format, the following parameters are derived.

Step #1, $N_{Da\ field}=N_{Da}/i_D$=1035 active lines per frame/2 fields per frame=517.5 active lines per field, $N_{a\ field}=N_a/i$= 1290/1=1290 active lines per field.

Step #2, B=$N_{DTL}\ N_{Da\ field}$=(1920 active luminance samples (bytes) per line) (517.5 active lines per field)=993,600 active luminance samples (bytes) per field.

Step #3, previously the number of active luminance samples per DVTR line was specified as $N_c$=1920 active luminance samples (bytes) per active line to conveniently store 2 film frames within 5 DVTR fields.

Step #4, $N_c$ is an integer and $n_{dcc}$=0 dummy samples.

Step #5, N=$N_c/0.85$=(1920 active luminance samples (bytes) per line(/0.85=2258.82 total luminance samples (bytes) per active DVTR line.

Step #6, N=2259 total luminance samples (bytes) per active DVTR line, rounded to the nearest integer.

Step #7, $N_{DTL}$=2200=2×2×2×5×5×11.

Step #8, N=2259=3×3×251. No factors are common with the factors of $N_{DTL}$.

Step #9, increment and decrement N until the number of common factors of $N_{DTL}$ and N is greatest. We shall use N=2200 in this situation so that 2 film frames are conveniently stored in 5 DVTR fields, as described above.

Step #10, $f_s$=N $N_T\ f_v$=(2200 total samples (bytes) per DVTR line) (1290 total lines per frame) (24 fields per second)(1 frame per field)=68.112 MHz.

Step 11, $$\frac{N N_T}{qi} = \frac{N_{DTL} N_{DT}}{r i_D}$$

$$\frac{(2200)(1290)}{q(1)} = \frac{(2200)(1125)}{r(2)}$$

$$\frac{(2 \times 3 \times 5 \times 43)}{q} = \frac{(5 \times 5 \times 5 \times 3 \times 3)}{r(2)}$$

$$\frac{172}{q} = \frac{75}{r}$$

Figure 16A:
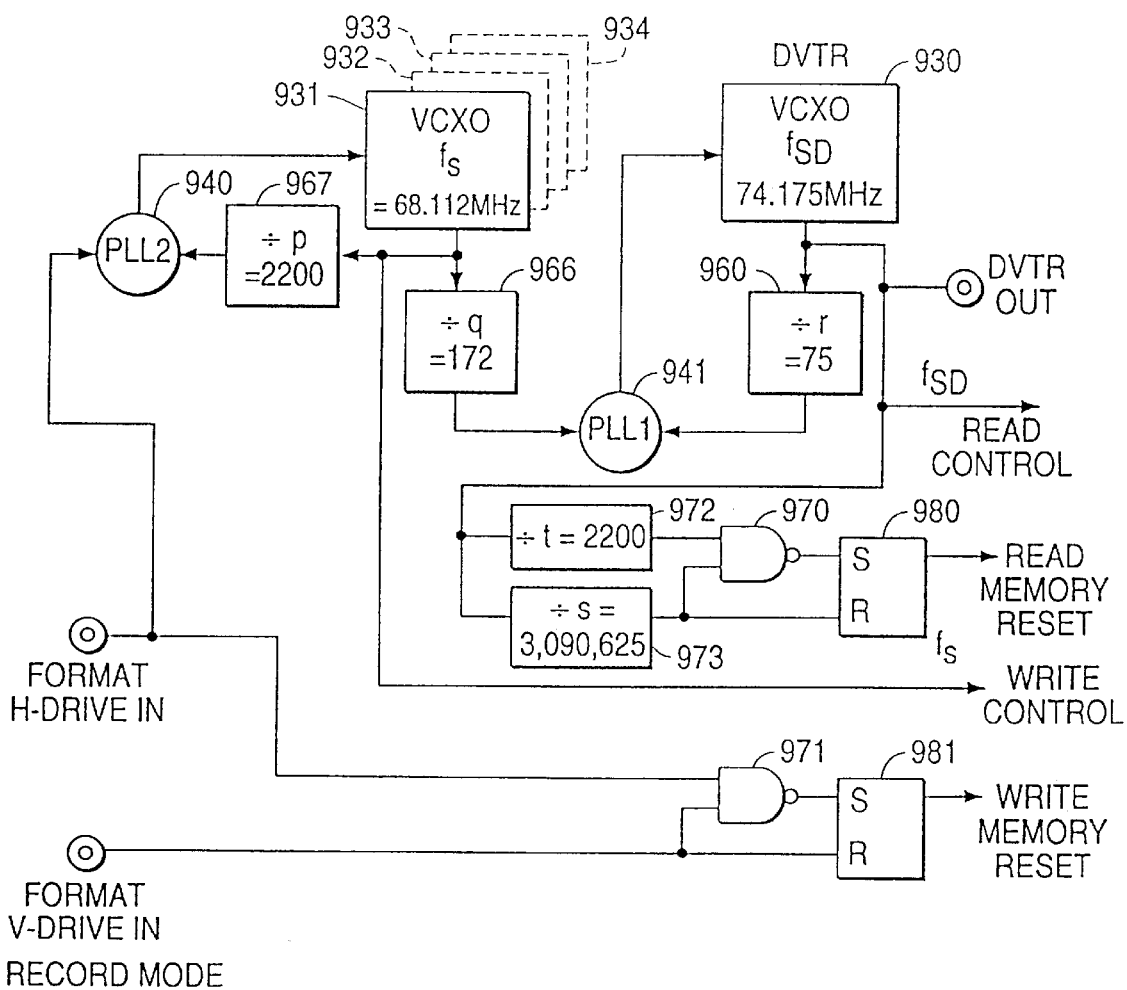
FIGS. 16(a) and (b) are record mode and playback mode block schematic diagrams, respectively, for a clock and control oscillator for motion picture film image.
Figure 16B:
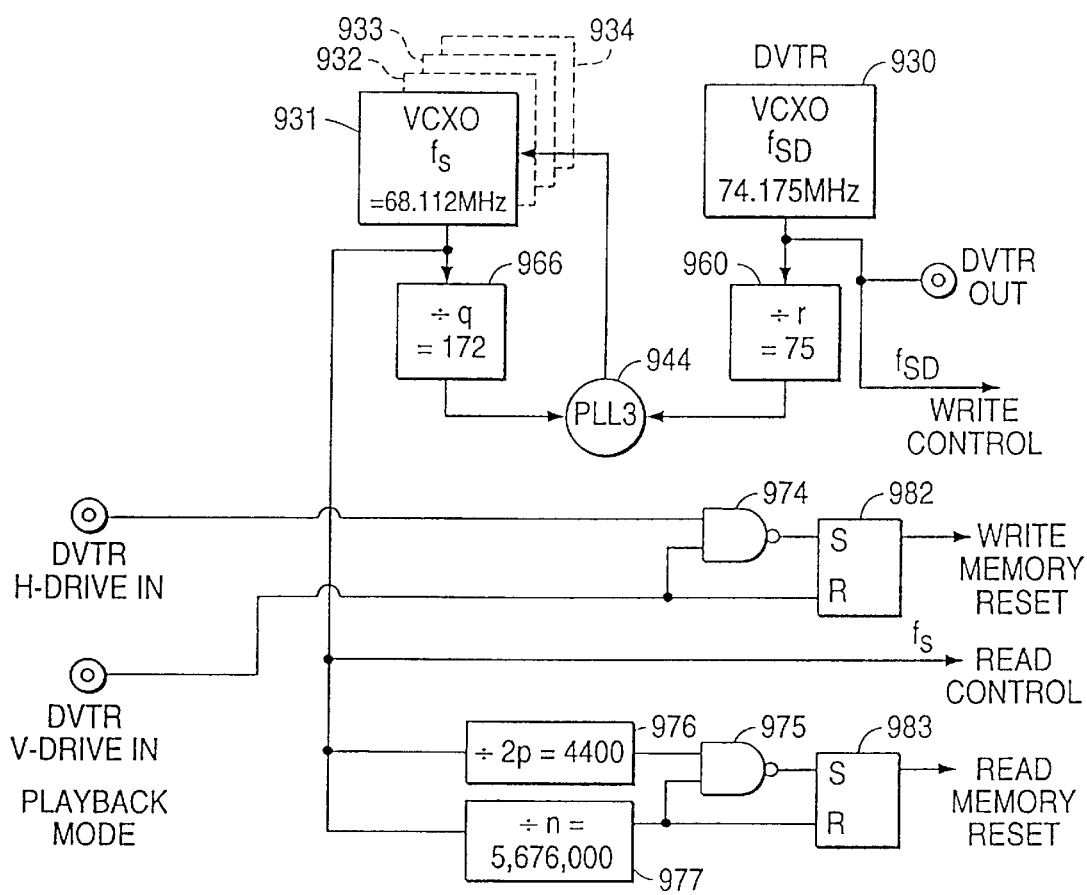

The product of the remaining factors of $N_{DTL}\ N_{DT}/i_D$ 3, 5 and 5, equals 75 and is designated r. The product of the uncommon factors of N and $N_T$ 2, 3, 5 and 43, equals 172 and is designated q. N itself, 2200, is designated p. The control circuitry can be built for the converting film to digital tape by conforming the circuitry of FIGS. 6(a) and 6(b) with the above calculated variables as illustrated in FIGS. 16(a) and 16(b).

STRUCTURING THE CONVERTER PARAMETERS FOR CONVERTING A MOTION PICTURE FILM IMAGE TO A FORMAT FOR DIGITAL MAGNETIC RECORDING ACCORDING TO THE SECOND EMBODIMENT

Step #1, $N_{Da\ field}=N_{Da}/i_D$=1035 active lines per frame/2 fields per frame=517.5 active lines per field, $N_{a\ field}=N_a/i$= 1290 active lines per field/1 field per frame=1290 active lines per field.

Step #1A, $R=N_{Da\ field}/N_{a\ field}=517.5/1290=0.4$. This value of R shows that the number of active lines in a DVTR field is 0.4 the number of lines produced by the telecine for a film frame. That is, 1 film frame can be stored in 2.5 DVTR fields, or more conveniently, 2 film frames can be stored in 5 DVTR fields.

Step #2, j/k=516/1290. j=516 lines is well matched to the 517–518 lines per field characteristic of the HDD-1000.

Step #3, $N_t$=1920 active luminance samples (bytes) per line to conveniently store 2 film frames in 5 DVTR fields.

Step #4, $N_c$ is an integer. Therefore, $N_c$=1920 active luminance samples (bytes) per line and d=0 dummy samples per line.

Step #5, $N=N_c/0.85$=(1920 active luminance samples (bytes) per line(/0.85=2258.82 total luminance samples (bytes) per DVTR line.

Step #6, N=2259 total luminance samples (bytes) per DVTR line, rounded to the nearest integer.

Step #7, $N_{DTL}$=2200=2×2×2×5×5×11.

Step #8, N=2259=3×3×251. Again, 2259 factors very poorly and has no factors in common with $N_{DTL}$.

Step #9, increment and decrement N until the number of common factors of $N_{DTL}$ and N is greatest. Take the larger factors of 2200 to find numbers close to 2033 having many of the same factors of 2200. We shall use N=2200 so that 2 film frames are conveniently stored in 6 DVTR fields, as described above.

Step #10, $f_s=N\ N_T\ f_v$=(2200 total samples (bytes) per DVTR line) (1290 total lines per frame) (24 fields per second) (1 frame per field)=63.112 MHz.

Step 11, $$\frac{N\ N_T}{qi} = \frac{N_{DTL}\ N_{DT}}{ri_D}$$

$$\frac{(2200)(1290)}{q(1)} = \frac{(2200)(1125)}{r(2)}$$

$$\frac{(2 \times 2 \times 43)}{q} = \frac{(3 \times 5 \times 5)}{r(2)}$$

$$\frac{172}{q} = \frac{75}{r}$$

The product of the remaining factors of $N_{DTL}\ N_{DT}/i_D$, 3 5 and 5, equals 75 and is designated r. The product of the uncommon factors of N and $N_T$ 2, 2 and 43, equals 172 and is designated q. N itself, 2200, is designated p. The control circuitry can be built for converting motion picture film to digital tape recording by conforming the circuitry of FIGS. 6(a) and 6(b) with the above calculated variables as illustrated in FIGS. 16(a) and 16(b).

The above-described television source formats and motion picture film to digital tape recording are examples for teaching the present invention. These exemplary source formats are in no way preferred over each other or any other source format. Using the principles taught by the above description, conversions for recording and playing back of any source format are possible.

THIRD EMBODIMENT FOR CONVERTING A MOTION PICTURE IMAGE TO A FORMAT FOR DIGITAL MAGNETIC RECORDING

In the first and second embodiments for converting a motion picture film image to a format for digital magnetic recording, the number of active lines per frame was 1290. 1920 8-bit samples were stored in each line. While 8-bit resolution is suitable for most applications, still greater luminance resolution can be obtained by using a standard DVTR. In particular, in accordance with this embodiment, nine bits are used for each luminance sample.

Figure 17A:
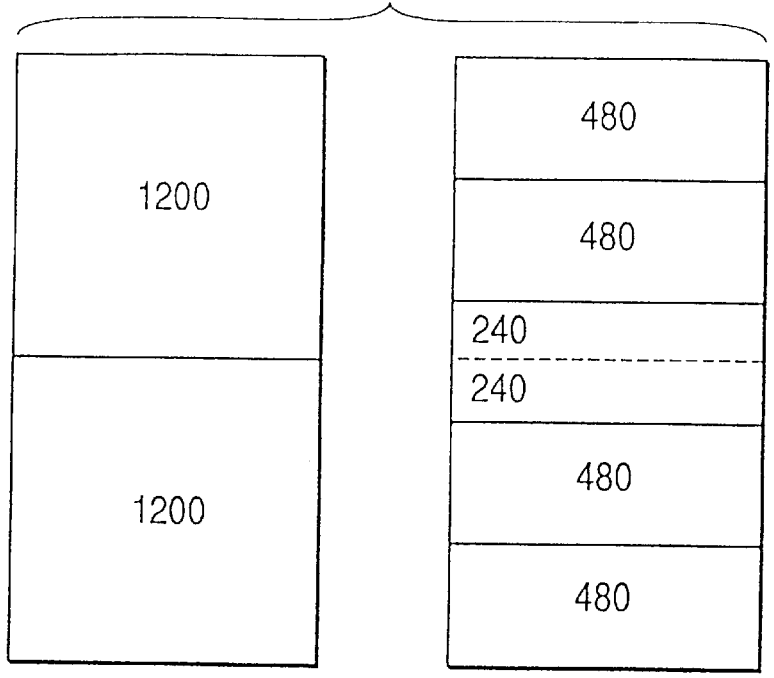
FIGS. 17(a) and 17(b) illustrate how lines of frames of a motion picture film image are arranged in the lines of fields of a digital video recorder for enhanced resolution.

To accomplish 9-bit luminance resolution, the number of active lines stored per frame of film is set to be 1200. Two frames of film are still stored in 5 fields of DVTR. But rather than using 516 lines per tape field for consecutive 8-bit samples, only 480 lines are used for consecutive 8-bit samples. FIG. 17(a) illustrates this feature. In field 1 of the DVTR is stored the first 480 lines of frame 1. In field 2 of the DVTR is stored the second 480 lines of frame 1 of the motion picture. Since 480×2=960 and there are 1200 lines per motion picture frame, there are 1200−960=240 lines left in frame 1. Those 240 lines are stored in the first 240 lines of tape field 3. The first 240 lines of frame 2 are stored in the next 240 lines of tape field 3. The next 480 lines of frame 2 are stored in tape field 4. 480 lines of frame 2 are left at this point and they are stored in tape field 5. Of course, as discussed in regard to FIG. 3, the DVTR stores 1920 samples per line of luminance data and 1920 samples per line of chrominance data. Therefore, in actuality there are two sets of data in the DVTR like that shown in FIG. 17(a), one for luminance data, one for chrominance data.

Figure 17B:
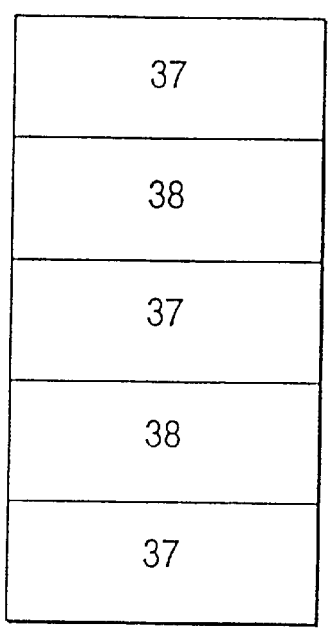

But as discussed earlier, each tape field contains either 517 or 518 lines, the number of lines per field alternating between 517 and 518. Thus, there are extra lines in each tape field not shown in FIG. 17(a). FIG. 17(b) show the extra lines. There are 37 or 38 extra lines in each tape field. These additional lines are used to store the extra bits required for 9-bit resolution. In this embodiment, only 37 lines per field are used for the extra bits. That means that one line in alternative tape fields goes unused. Since the line is available only in alternative fields, its use add unnecessarily to the complexity of the system and the 37 lines provide sufficient storage for 9-bit resolution. Again, as discussed above, there are 37 extra lines for luminance data and 37 extra lines for chrominance data.

To show that sufficient extra bits are available for 9-bit luminance resolution, consider the two film frames of FIG. 17(a). There are a total of 2400 active lines in those two frames (2×1200 active lines per frame). There are 1920× 2400=4,608,000 samples in those two frames. Thus, to add a ninth bit to each sample, one needs 4,608,000 additional bits.

Referring to FIG. 17(b), there are five extra sets of 37 lines each or a total of 185 lines. But there are 185 extra lines for luminance data and 185 extra lines for chrominance data, for a total of 370 extra lines. Those 370 lines have 1920 8-bit bytes in them or a total of 710,400 bytes of 8 bits each. That means there are 8×710,400=5,683,200 extra bits in those 5 tape fields. Thus, the 9th bits can be sequentially stored in the extra lines, allowing 9 bits of resolution. Note that luminance data is being stored in an area the DVTR interprets as chrominance data. This is necessary to have enough space to store all the 9th bits. Only 9th bits for each luminance sample are stored. All chrominance samples are 8 bits. However, the human eye is more sensitive to brightness valves than to slight variations in color. Therefore, adding a ninth bit of luminance data is far more important than adding a ninth bit of chrominance data.

Figure 18:
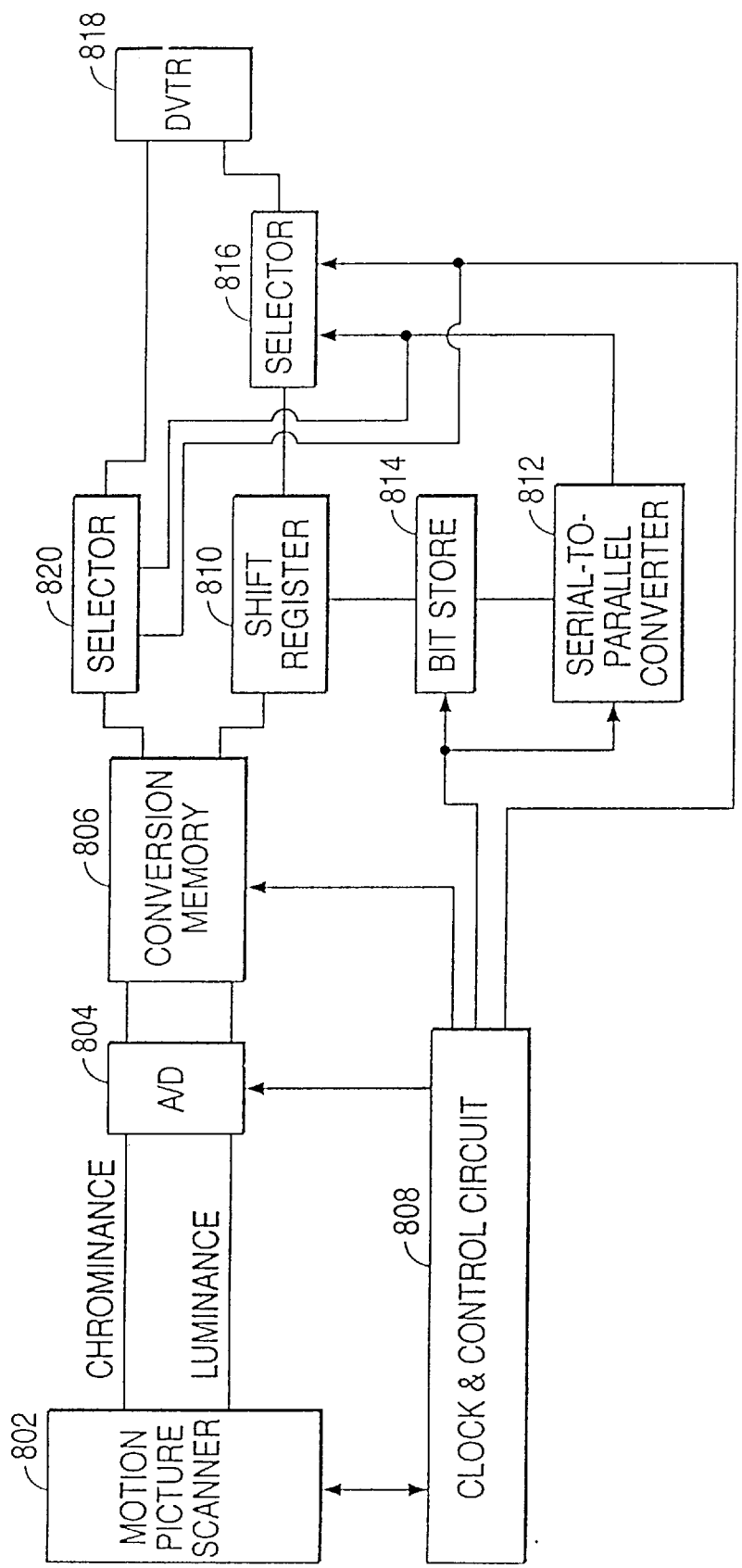
FIG. 18 shows a record mode block diagram for recording a motion picture on a digital video recorder with enhanced resolution.

Referring to FIG. 18, a block, diagram of a device in accordance with this embodiment of the invention is shown. A motion picture scanner 802 scans a motion picture and generates analog outputs representing the image. One such device is called a telecine and several manufacturers, including, for example, Kodak, manufacture and sell such devices. As shown in FIG. 18, chrominance and luminance data are provided by motion picture scanner 802. However, the motion picture scanner 802 could provide R, G, B outputs as described in regard to FIG. 2. If so, a matrix 211, as shown as in FIG. 2, could be used to convert the R, G, B data to Y, $P_B$ and $P_R$ data. Similarly, a digital motion picture scanner 802 could be used.

Assuming an analog motion picture scanner 802, the chrominance and luminance data would be digitized in A/D converter 804. The chrominance values will be digitized to 8 bits. The luminance values will be digitized to 9-bits. The digitized values will be passed to conversion memory 806, where they will be stored and read at different rates to convert the data to a format compatible with the DVTR, as has been discussed in detail earlier in this application. Of course, if $P_B$ and $P_R$ chrominance data are provided, conversion memory 806 will multiplex them to a single chrominance data stream.

The 8-bit chrominance valves from conversion memory 806 are passed to DVTR 818 through selector 820 (discussed later) for recording as chrominance data as shown in FIG. 17(a).

The 9-bit luminance values pass to shift register 810. The least significant bits of the 9-bit bytes are passed serially to bit store 814. Bit store 814 collects all the 9th bits passed by shift register 810. The output of bit store 814 is supplied to serial-to-parallel converter 812, which form 8-bit bytes from the 9th bits. The output of serial-to-parallel converter 812 is supplied to selector 816 and selector 820. Selector 816 selects either data from shift register 810 or serial-to-parallel converter 812 for input to the DVTR 818 luminance input. Selector 820 selects either the 8-bit chrominance data from conversion memory 806 or serial-to-parallel converter 812 for input to the DVTR 818 chrominance input. Conversion memory 806, bit store 814, and selectors 816 and 820 are under the control of clock and control circuit 808, which controls the timing and operation of those elements.

In operation, during the first 480 lines of each tape field DVTR 818 receives luminance and chrominance data from the conversion memory 806. That is, during this period, selectors 816 and 820 select chrominance data from the conversion memory and the 8 most significant bits of luminance data from the conversion memory, as supplied by shift register 810. Also, during this period the 9th bits (least significant bits) of the luminance data are being collected and stored in bit store 814 by shift register 810. Starting with the 481st line and for 37 lines, selectors 816 and 820 select data from serial-to-parallel converter 812 as chrominance and luminance inputs to DVTR 818. This process continues until all the 9th bits are stored. Any remaining space in the tape fields can be used as dummy samples or dummy lines are previously described.

Referring now to FIG. 19A, the conversion from DVTR storage to motion picture format output is described. In this embodiment, it is assumed that the motion picture output will be displayed on a display 872 taking R, G, B inputs. Therefore, a matrix 870 is provided to give the R, G, B outputs. Of course, the display could take chrominance and luminance inputs directly and avoid the need for matrix 870. Further, display 872 could accept digital inputs and avoid the need for D/A converter 886.

DVTR 818 outputs chrominance and luminance data streams of 8-bit bytes. Recall that the exemplary DVTR uses 2:1 interlacing. When odd fields are being output by the DVTR, demultiplexers 874 and 878 direct the luminance and chrominance data to odd field processor 880. When even fields are being read by the DVTR, demultiplexers 874 and 878 direct the data to even field processor 882. In the odd field processor 880 and even field processor 882, the 9 bit luminance samples are reconstructed. The outputs of odd field processor 880 and even field processor 882 are fed to multiplexer 884, which selects data from one of the processors to supply to conversion memory 885. When odd field data is being written to odd field processor 880, multiplexer 884 selects the data from even field processor 882 for provision to conversion memory 885 and vice versa.

Figure 19B:
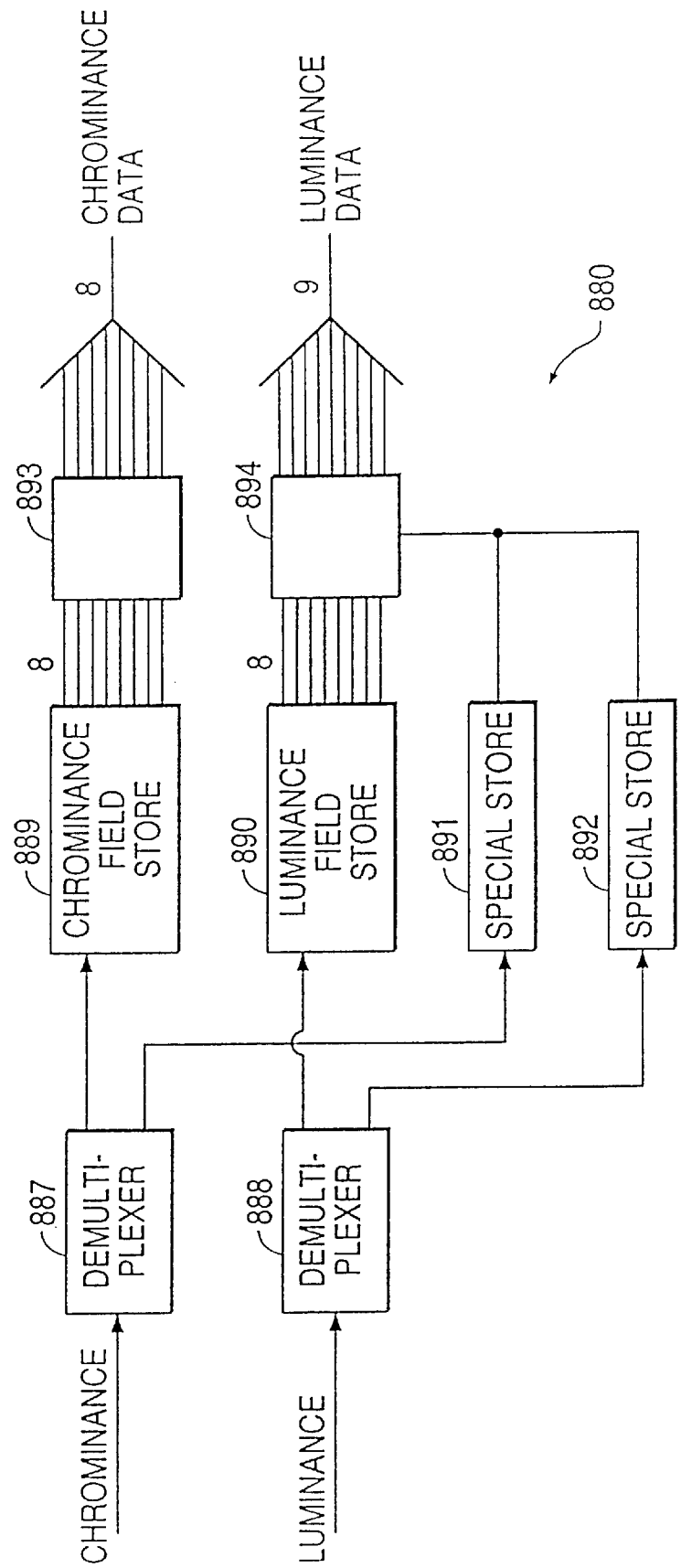

More details of the odd field processor 880 may be found in FIG. 19B. Even field processor 882 is similar and will not be separated described. Chrominance and luminance data is received by the processor and passed to demultiplexers 887 and 888, respectively. During the first 480 lines of each field, demultiplexers 887 and 888 pass the chrominance and luminance data to chrominance field store 889 and luminance field store 890, respectively. During the last 37 lines, the data is passed to special stores 891 and 892. The data stored in 891 and 892 then is the 9th bits of luminance data and any dummy samples previously stored. After the field is completely read into the processor 880, an output sequence begins. Note that during the output sequence of processor 880, processor 882 is receiving and storing data from the DVTR. Similarly, when a storing operation is occurring in processor 880, processor 882 is performing an output sequence. The output sequence involves the formation of 9-bit luminance samples. Data is read from the chrominance store 889 and luminance store 890 and passed to shift registers 893 and 894, respectively. The 9th bit for that luminance sample is the read from special stores 891 or 892 and provided as the least significant bit to shift register 894. Shift register 894 then passes the 9 bit luminance data to its output.

The data from the outputs of odd field processor 880 and even field processor 882 are passed to multiplexer 884 (FIG. 19A), which selects data from one of the two processors to supply to its output. The output of multiplexer 884 is passed to conversion memory 885 where the data is converted to the output format, as has been previously described. The outputs of conversion memory 885, in a preferred embodiment, are $Y_D$, $P_{BD}$ and $P_{RD}$ signals, which are then converted to analog signals in D/A converter 886. The analog signals are then converted to R,G,B signals in matrix 870 for display on display 872.

Figure 20:
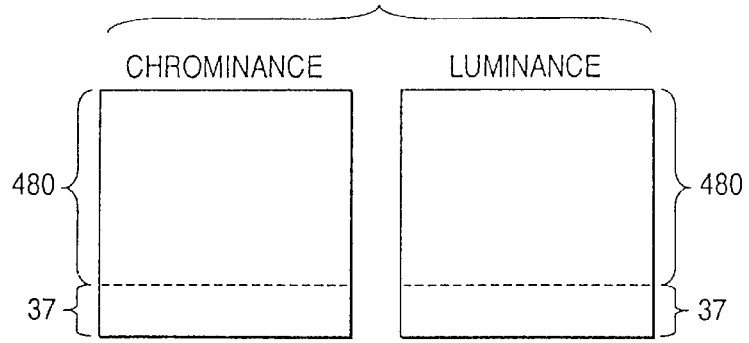
FIG. 20 illustrate how lines of frames of a motion picture film image are arranged in the lines of fields of a digital video recorder for enhanced resolution.

Consider the tape fields shown in FIG. 20. The one on the left is the chrominance data; the one on the right is the luminance data. Recall that the first 480 lines of each field contain sequential 8-bit samples, either chrominance or luminance. In the last 37 lines are held extra bits necessary to give 9-bit resolution. Recall that for 9-bit luminance resolution, 480×1920=921,600 extra bits are required. In the two sets of 37 lines are 2×37×1920×8=1, 136, 640 bits. Thus, even after storing a 9th bit for each luminance valve, there are 1, 136,640−921,600=215,040 bits left. As discussed above, these bits could be used to store additional data, such as frame identification data. Moreover, the extra bits can be used to hold data giving 10-bit resolution for some of the luminance samples. Of course, since 215, 040<921,600, 10th bits for each luminance sample could not be stored. Rather, samples would be selected so as to maximize the benefit of the 10th bits.

For example, as is well known in the art, human eyes as more sensitive to the low frequency components of video signals than to high frequency components. Therefore, a given amount of low frequency noise is often annoying to a viewer while the same amount of high frequency noise is almost imperceptible. By providing 10-bit resolution for samples representing low frequency components, the picture quality, as perceived by a viewer, can be significantly enhanced.

To implement such a partial 10-bit embodiment, it is preferable to digitize all the luminance components to 10 bits. Then, in the frequency domain, take the samples through a low pass filter to separate out the low frequencies and store them in 10 bits. The low frequency components are subtracted from the composite signal and the remaining samples have the least significant bit truncated and are stored as 9-bit samples.

Since there are 921,600 samples and 215,040 extra bits, 215,040/921,600=23% (approx.) of the luminance samples could be stored as 10 bits. For simplicity, in a preferred embodiment, 20% or ⅕ of the luminance samples are stored as 10-bits.

Figure 21:
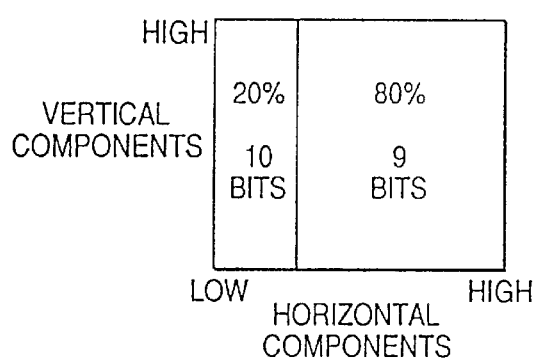
FIGS. 21–23 illustrate digital filters for use with the instant invention to obtain enhanced resolution when recording a motion picture image on a digital video recorder.
Figure 22:
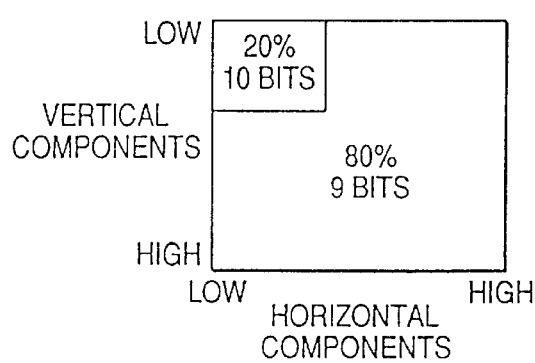
Figure 23:
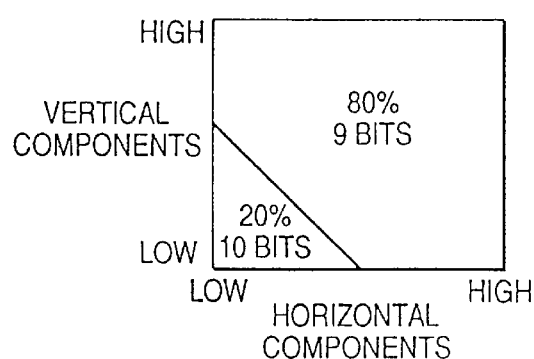

FIGS. 21–23 illustrate various digital filters that can be used with the instant invention. FIG. 21 illustrates the simplest digital filter. As shown, the 20% of the samples having the lowest horizontal frequency components are chosen for 10-bit resolution.

FIG. 22 illustrates a digital filter that selects the lowest frequency vertical components and lowest frequency horizontal components for storing as 10-bits.

Finally, FIG. 23 shows a diagonal digital filter for choosing low frequency components. The diagonal filter is usually preferably since it selects more of the very low frequency vertical and horizontal components than do the filters of FIGS. 21 and 22. These digital filters and their implementation are well known in the art.

When the data is read for conversion back into film format, a look-up table is employed to match the 9th bit (or 9th and 10th bits) with its (their) respective 8-bit sample. Note that the 9th bit (or 9th and 10th bits) is (are) a least significant bit(s). Therefore, if a less sophisticated system is used for read-out, then the 9th bit (or 9th and 10th bits) can be ignored. The system would use only the 8-bit samples sequentially stored in the first 480 lines of each tape field. By using this embodiment, 9-bit (or 10 bit) resolution is possible when needed, but the system is still compatible with 8-bit systems Similarly, if a 9-bit conversion system is used, the 10th bits may be ignored.

In the 9-bit and 10-bit embodiments, 1200 scanning lines are used for each frame of film. Note that in the 8-bit embodiment 1290 scanning lines were used per film frame. Thus, to provide 9-bit horizontal resolution, some vertical resolution is lost. Also, the 1200 lines is a preferred embodiment only. Other vertical resolutions may be chosen and fall within the scope of this invention.

I claim:

1. An apparatus for converting a motion picture film image signal from a first film image signal format to a second signal format, the second signal format compatible with a digital tape recorder, the first film image signal format having a first frame rate and the second signal format having a first field rate, the apparatus comprising:

a memory for storing first lines of data, the first lines of data stored in an arrangement representing both the first film image signal format and the second signal format;

first means, responsive to the first frame rate, for generating a first synchronizing signal;

second means, responsive to the first field rate, for generating a second synchronizing signal; and control means, coupled to the memory and responsive to the first synchronizing signal and the second synchronizing signal, for storing the first lines of data in the memory in synchronism with the first synchronizing signal and for reading the first lines of data from the memory in synchronism with the second synchronizing signal.

2. The apparatus according to claim 1 further comprising a sampling circuit, responsive to the first means, for sampling the first film image signal format in synchronism with the first frame rate to produce the first lines of data stored in the memory when the first film image signal format is being converted to the second signal format.

3. The apparatus according to claim 2 further comprising dummy line generating means, coupled to the sampling circuit and the memory means and responsive to the first frame rate and the first field rate, for generating dummy lines of data for storage with the first lines of data produced by the sampling circuit and stored in the memory.

4. The apparatus according to claim 3, wherein the dummy lines of data include data related to frame identification of the first film image signal format.

5. The apparatus according to claim 1 further comprising dummy lines of data generating means, coupled to the memory means and responsive to the first frame rate and the first field rate, for generating dummy lines of data for storage with the first lines of data stored in the memory.

6. The apparatus according to claim 1, wherein the frame rate of the first film image signal format is 24 frames per second, and the field rate of the second signal format is 60 fields per second.

7. An apparatus for converting a motion picture film image from a first signal format to a second signal format, the first signal format having a first frame comprising a first predetermined number of lines of data, and the second signal format having a first field comprising a second predetermined number of lines of data, the apparatus comprising:

a memory for storing lines of data;

first means, responsive to the first predetermined number of lines of data of the first frame, for generating a first timing signal;

second means, responsive to the second predetermined number of lines of data of the first field, for generating a second timing signal;

determining means, coupled to the first means and the second means, for determining a first predetermined number of spare lines of data to be arranged with lines of data of the first signal format to form a first field; and control means, coupled to the memory and the determining means, for storing lines of data in the memory in response to the first timing signal and for reading lines of data from the memory in response to the second timing signal, the first predetermined number of spare lines of data being included with the lines of data read from the memory when the data is read to form a first field of the second signal format.

8. The apparatus according to claim 7, wherein the spare lines include frame identification data of the first signal format.

9. A method of converting a motion picture film image signal from a first signal format to a second signal format, the second signal format compatible with a digital tape recorder, the first signal format having a first frame rate and the second signal format having a first field rate, the method comprising the steps of:

generating a first synchronizing signal in response to the first field rate;

generating a second synchronizing signal in response to the first frame rate; and storing first lines of data in a memory in synchronism with the first synchronizing signal and reading the first lines of data from the memory in synchronism with the second synchronizing signal, the first lines of data stored in the memory in an arrangement representing both the first signal format and the second signal format.

10. The method according to claim 9 further comprising the step of storing second lines of data in the memory with the first lines of data in synchronism with the first synchronizing signal, and reading first lines of data and second lines of data from the memory in synchronism with the second synchronizing signal.

11. The method according to claim 10 wherein the second lines of data include frame identification data of the first signal format.

12. An apparatus for converting a first signal format to a first film image signal format, the first signal format compatible with a digital tape recorder, the first signal format having a first field rate and the first film image signal format having a first frame rate, the apparatus comprising:

a memory for storing first lines of data, the first lines of data stored in an arrangement representing both the first signal format and the first film image signal format;

first means, responsive to the first field rate, for generating a first synchronizing signal;

second means, responsive to the first frame rate, for generating a second synchronizing signal; and control means, coupled to the memory and responsive to the first synchronizing signal and the second synchronizing signal, for storing the first lines of data in the memory in synchronism with the first synchronizing signal and for reading the first lines of data from the memory in synchronism with the second synchronizing signal.

13. The apparatus according to claim 12 wherein the first lines of data include dummy lines of data.

14. The apparatus according to claim 13, wherein the dummy lines of data include related to frame identification of the first film image signal format.

15. The apparatus according to claim 22 further comprising format assembly means, coupled to the memory means and responsive to the first means and the second means, for assembling the first film image signal format from the first lines of data read from the memory when the first signal format is being converted to the first film image signal format.

16. The apparatus according to claim 12, wherein the field rate of the first signal format is 60 fields per second, and the frame rate of the first film image signal format is 24 frames per second.

17. An apparatus for converting a first signal format to a first film image signal format, the first signal format having a first field comprising a first predetermined number of lines of data, and the first film image signal format having a first frame comprising a second predetermined number of lines of data, the apparatus comprising:

a memory for storing lines of data;

first means, responsive to the first predetermined number of lines of data of the first field, for generating a first timing signal;

second means, responsive to the second predetermined number of lines of data of the first frame, for generating a second timing signal; and control means, coupled to the memory and said first and second means for generating, for storing lines of data in the memory in response to the first timing signal and for reading lines of data from memory in response to the second timing signal.

18. The apparatus according to claim 17 wherein the lines of data include spare lines.

19. The apparatus according to claim 18, wherein the spare lines include from identification data of the first film image signal format.

20. The apparatus according to claim 17 further comprising film image format assembly means, coupled to the memory and responsive to the second timing signal, for assembling the first film image signal format from the lines of data read from the memory when the first signal format is being converted to the first film image signal format.

21. The apparatus according to claim 18 further comprising film image format assembly means, coupled to the memory and responsive to the second timing signal, for assembling the film image signal format from the lines of data read from the memory when the first signal format is being converted to the first film image signal format.

22. The apparatus according to claim 21, wherein the first format reassembly means extracts frame identification data from the spare lines stored in the memory.

23. A method of converting a first signal format to first film image signal format, the first signal format compatible with a digital tape recorder, the first signal format having a first field rate and the first film image signal format having a first frame rate, the method comprising the steps of:

generating a first synchronizing signal in response to the first field rate;

generating a second synchronizing signal in response to the first frame rate; and storing first lines of data in a memory in synchronism with the first synchronizing signal and reading the first lines of data from the memory in synchronism with the second synchronizing signal.

24. The method according to claim 23 further comprising the step of storing the second lines of data in the memory with the first lines of data in synchronism with the first synchronizing signal, and reading the first lines of data and the second lines of data from the memory in synchronism with the second synchronizing signal.

25. The method according to claim 24 wherein the second lines of data include frame identification data of the first film image signal format.

26. An apparatus for converting an analog motion picture film image signal from a first film image signal format to a second signal format, the second signal format compatible with a digital tape recorder, the first film image signal format having a first frame rate and the second signal format having a first field rate, the apparatus comprising:

analog-to-digital converter means for converting said motion picture film image signal to a luminance digital signal and a chrominance digital signal, said chrominance digital signal comprising samples of Y bits each, said luminance digital signal comprising samples comprising X bits each, where X>Y;

memory means for storing said luminance samples and chrominance samples, including means for storing said chrominance samples as consecutive Y bit samples and said luminance samples as 1) consecutive Y bit samples and 2) additional samples for the X-Y additional bits of each luminance sample;

first means, responsive to the first frame rate, for generating a first synchronizing signal;

second means, responsive to the first field rate, for generating a second synchronizing signal; and control means, coupled to the memory means and responsive to the first synchronizing signal and the second synchronizing signal, for storing the chrominance and luminance samples in synchronism with said first synchronizing signal and for reading the chrominance and luminance samples in synchronism with said second synchronizing signal.

27. An apparatus in accordance with claim 26 wherein Y equals 8 and X equals 9.

28. An apparatus in accordance with claim 26 wherein Y equals 8 and X equals 9 or 10.

29. An apparatus for converting a motion picture film image signal from a first film image signal format to a second signal format, the second signal format compatible with a digital tape recorder, the first film image signal format having a first frame rate and the second signal format having a first field rate, said motion picture film image being defined by chrominance and luminance digital signals, the chrominance digital signal comprising consecutive Y bit samples, the luminance digital signal comprising consecutive X bit samples, where X>Y, the apparatus comprising:

memory means for storing said luminance samples and chrominance samples, including means for storing said chrominance samples as consecutive Y bit samples and said luminance samples as 1) consecutive Y bit samples and 2) additional samples for the X-Y additional bits of each luminance sample;

first means, responsive to the first frame rate, for generating a first synchronizing signal;

second means, responsive to the first field rate, for generating a second synchronizing signal; and control means, coupled to the memory means and responsive to the first synchronizing signal and the second synchronizing signal, for storing and chrominance and luminance samples in synchronism with said first synchronizing signal and for reading the chrominance and luminance samples in synchronism with said second synchronizing signal.

30. An apparatus in accordance with claim 29 wherein Y equals and Y equals 9.

31. An apparatus in accordance with claim 29 wherein X equals 8 and Y equals 9 or 10.

32. An apparatus for converting an analog motion picture film image signal stored in a first signal format compatible with a digital tape recorder to a second signal format comprising a motion picture signal film format, the first signal format having a first field rate and the second signal format having a first frame rate, said digital tape recorder supplying digital chrominance signals comprising consecutive Y bit digital samples and digital luminance signals comprising 1) consecutive Y bit digital samples and 2) additional samples having Y bits, each bit corresponding to one of said Y bit consecutive samples thereby providing X bit luminance samples, where X>Y, the apparatus comprising:

memory means for storing said luminance samples and chrominance samples, said memory means including means for reading said chrominance samples as consecutive Y bit samples and said luminance samples as consecutive X bit samples by reading said consecutive Y bit luminance samples and adding additional bits from said additional samples to give X bit luminance samples;

first means, responsive to the first field rate, for generating a first synchronizing signal;

second means, responsive to the first frame rate, for generating a second synchronizing signal; and control means, coupled to the memory means and responsive to the first synchronizing signal and the second synchronizing signal, for storing and chrominance and luminance samples in synchronism with said first synchronizing signal and for reading the chrominance and luminance samples in synchronism with said second synchronizing signal.

33. An apparatus in accordance with claim 32 wherein Y equals 8 and X equal 9.

34. An apparatus in accordance with claim 32 wherein Y equals 8 and X equals 9 or 10.

* * * * *

UNITED STATES PATENT AND TRADEMARK OFFICE
CERTIFICATE OF CORRECTION

PATENT NO.: 5,841,480

DATED: November 24, 1998

INVENTOR(S): Charles W. RHODES

It is certified that an error appears in the above-identified patent and that said Letters Patent is hereby corrected as shown below:

Column 35, line 41, claim 15, delete "22" and insert --12--.

Signed and Sealed this

Ninth Day of March, 1999

Attest:

Q. TODD DICKINSON

*Attesting Officer*   Acting Commissioner of Patents and Trademarks